US008966657B2

(12) United States Patent
Martinez et al.

(10) Patent No.: US 8,966,657 B2
(45) Date of Patent: Feb. 24, 2015

(54) PROVISIONING, UPGRADING, AND/OR CHANGING OF HARDWARE

(75) Inventors: Alberto J. Martinez, El Dorado Hills, CA (US); William A. Stevens, Jr., Folsom, CA (US); Purushottam Goel, Beaverton, OR (US); Ernie Brickell, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 561 days.

(21) Appl. No.: 12/655,579

(22) Filed: Dec. 31, 2009

(65) Prior Publication Data

US 2011/0161672 A1 Jun. 30, 2011

(51) Int. Cl.
G06F 21/00 (2013.01)
H04L 29/06 (2006.01)
G06F 21/57 (2013.01)
H04L 9/32 (2006.01)

(52) U.S. Cl.
CPC .......... *H04L 63/08* (2013.01); *G06F 21/57* (2013.01); *H04L 63/06* (2013.01); *H04L 9/3249* (2013.01); *H04L 2209/56* (2013.01)
USPC .......................................................... 726/30

(58) Field of Classification Search
USPC .................................... 713/176; 726/30
See application file for complete search history.

(56) References Cited

U.S. PATENT DOCUMENTS

| | | | | |
|---|---|---|---|---|
| 4,835,682 A * | 5/1989 | Kurachi et al. | ............... | 711/164 |
| 5,948,101 A * | 9/1999 | David et al. | ...................... | 713/2 |
| 6,304,831 B1 * | 10/2001 | Murdock et al. | ............... | 702/132 |
| 6,332,025 B2 * | 12/2001 | Takahashi et al. | ............ | 380/281 |
| 6,510,513 B1 * | 1/2003 | Danieli | ......................... | 713/156 |
| 6,683,954 B1 * | 1/2004 | Searle | ............................. | 380/30 |
| 6,789,135 B1 * | 9/2004 | Yamamoto et al. | ............... | 710/8 |
| 7,213,152 B1 | 5/2007 | Gafken et al. | | |
| 7,278,016 B1 * | 10/2007 | Detrick et al. | .................... | 713/2 |
| 7,765,409 B2 | 7/2010 | Gafken et al. | | |
| 7,783,898 B2 * | 8/2010 | Detrick et al. | ................ | 713/190 |
| 7,795,899 B1 * | 9/2010 | Grohoski et al. | ................. | 326/8 |
| 7,978,850 B2 * | 7/2011 | Sabev | ............................ | 380/46 |
| 8,595,324 B2 | 11/2013 | Carrigan et al. | | |
| 2001/0051928 A1 * | 12/2001 | Brody | ............................ | 705/52 |
| 2002/0048369 A1 * | 4/2002 | Ginter et al. | .................. | 380/277 |
| 2002/0181641 A1 * | 12/2002 | Wingen | ....................... | 375/377 |
| 2002/0199110 A1 * | 12/2002 | Kean | ............................ | 713/189 |

(Continued)

FOREIGN PATENT DOCUMENTS

| | | |
|---|---|---|
| CN | 1422404 | 6/2003 |
| CN | 1746848 | 3/2006 |

(Continued)

OTHER PUBLICATIONS

Schneier, "Applied Crytography", 1996, Wiley and Sons.*

(Continued)

*Primary Examiner* — Bradley Holder
(74) *Attorney, Agent, or Firm* — Konrad Raynes Davda & Victor LLP; David W. Victor

(57) ABSTRACT

In some embodiments a secure permit request to change a hardware configuration is created. The secure permit request is sent to a remote location, and a permit sent from the remote location in response to the permit request is received. The hardware configuration is changed in response to the received permit. Other embodiments are described and claimed.

64 Claims, 11 Drawing Sheets

(56) References Cited

U.S. PATENT DOCUMENTS

| | | | |
|---|---|---|---|
| 2003/0144960 A1* | 7/2003 | Galka | 705/52 |
| 2004/0010643 A1 | 1/2004 | Thomas, III | |
| 2004/0139338 A1* | 7/2004 | Ohmori et al. | 713/193 |
| 2005/0039016 A1 | 2/2005 | Aissi et al. | |
| 2005/0060388 A1 | 3/2005 | Tatsumi et al. | |
| 2005/0180572 A1* | 8/2005 | Graunke | 380/277 |
| 2005/0246433 A1 | 11/2005 | Carrigan et al. | |
| 2006/0248346 A1* | 11/2006 | Shiomi et al. | 713/184 |
| 2007/0058807 A1* | 3/2007 | Marsh | 380/44 |
| 2007/0098152 A1* | 5/2007 | Detrick et al. | 380/30 |
| 2008/0298589 A1* | 12/2008 | Katar et al. | 380/258 |
| 2008/0320263 A1 | 12/2008 | Nemiroff et al. | |
| 2009/0034732 A1* | 2/2009 | Sabev | 380/277 |
| 2009/0136041 A1 | 5/2009 | Tsu | |
| 2009/0238367 A1* | 9/2009 | Pinder | 380/279 |
| 2010/0005295 A1* | 1/2010 | Chakarapani et al. | 713/168 |
| 2010/0011355 A1 | 1/2010 | Carrigan et al. | |
| 2010/0189265 A1* | 7/2010 | Ito et al. | 380/285 |
| 2011/0029769 A1 | 2/2011 | Aissi et al. | |

FOREIGN PATENT DOCUMENTS

| | | |
|---|---|---|
| CN | 1868189 | 11/2006 |
| CN | 101133420 | 2/2008 |
| CN | 100458682 | 2/2009 |
| CN | 101448127 | 6/2009 |
| EP | 2026266 | 2/2009 |
| JP | 2004046831 | 2/2004 |
| JP | 2004086392 | 3/2004 |
| JP | 2005202503 | 7/2005 |
| JP | 2009003933 | 1/2009 |
| JP | 2009048627 | 3/2009 |
| KR | 20020005929 | 1/2002 |

OTHER PUBLICATIONS

Chinnaswamy et al. "Method and System to Facilitate Configuration of a Hardware Device in a Platform", U.S. Appl. No. 12/347,879, filed Dec. 31, 2008, 31 pages.

International Search Report and Written Opinion for International Application No. PCT/US2010/060115, mailed Sep. 5, 2011, 7 pp. [77259PCT (ISR & WO)].
International Preliminary Report on Patentability (IPRP) for International Application No. PCT/US2010/060115, dated Jul. 12, 2012, 5 pp. [77.256PCT (IPRP)].
EP Publication No. 2026266, dated Feb. 18, 2009, is an English language equivalent of JP2009048627, dated Mar. 5, 2009.
US Publication No. 2004/0010643, dated Jan. 15, 2004, is an English language equivalent of JP2004046831, dated Feb. 12, 2004.
US Publication No. 2005/0060388, dated Mar. 17, 2005, is an English language equivalent of JP2004086392, dated Mar. 18, 2004.
US Publication No. 2008/0320263, dated Dec. 25, 2008, is an English language equivalent of JP2009003933, dated Jan. 8, 2009.
Machine Translation of JP Publication No. 2005-202503, dated Jul. 28, 2005, 17 pp.
Office Action 1 for JP Application No. 2012-546023, dated Oct. 22, 2013, 6 pp.
"Notice of Reasons for Rejection" comprising English language summary of Office Action 1 for JP Application No. 2012-546023, dated Oct. 22, 2013, 3 pp.
Response to Office Action 1 for JP Application No. 2012-546023, dated Feb. 21, 2014, 36 pp. (w/ Partial Translation and Translation of Claims on File) [77.259JP (ROA1)].
Notice of Allowance for JP Application No. 2012-546023, dated Mar. 18, 2014, 16 pp. (w/ Partial Translation and Translation of Claims on File) [77.259JP (NOA1)].
Office Action 1 and Search Report for CN Application No. 201080060359.8, dated Jun. 5, 2014, 90 pp. (with English Language Translation).
Yongyong, Y., "Studies and Design of EFI BIOS Based Remote Assisting System", A Collection of MA Theses from University of Electronic Science and Technology, Aug. 21, 2009, 75 pp. (Concise explanation of relevance found on pgs. 3, 4, 8, 14, 15, 17, 22, 23, 24, 28, 30, 36, 37, 39, 43, 44, 45 of translation of Office Action 1 cited as reference No. 1 above).
Google Translation of CN Publication No. 1746848, dated Mar. 15, 2006, 6 pp.
Google Translation of CN Publication No. 101133420, dated Apr. 13, 2011, 28 pp.

\* cited by examiner

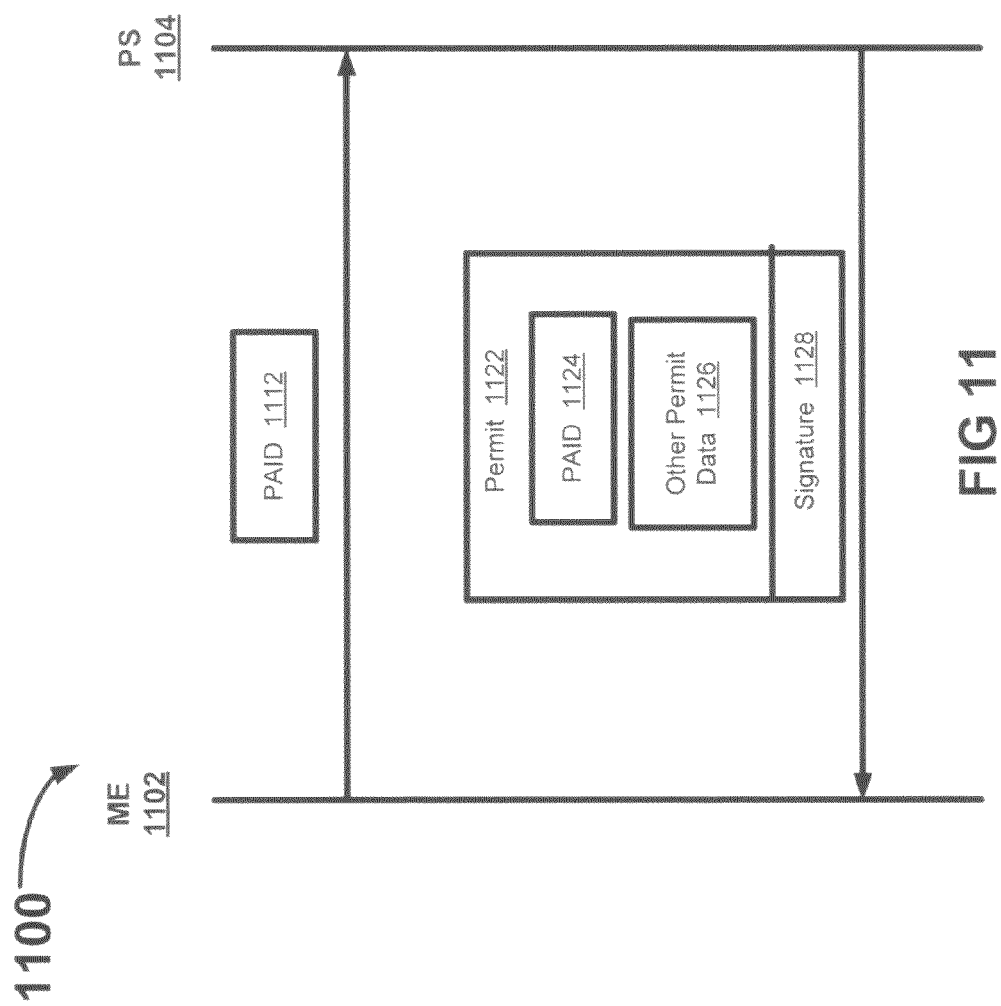

US 8,966,657 B2

PROVISIONING, UPGRADING, AND/OR CHANGING OF HARDWARE

TECHNICAL FIELD

The inventions generally relate to provisioning, upgrading, and/or changing of hardware.

BACKGROUND

Currently, in order to change hardware (for example a SKU or Stock Keeping Unit) in a computer system manufacturers use a testing station on the manufacturing floor. It would be beneficial to allow for hardware (and/or SKU) provisioning or changing to be done directly to the consumer of the component (for example, by the OEM and/or end user or IT department of the end user) rather than using the current process of testing on the manufacturing floor.

Additionally, current techniques in the computer industry of upgrading a hardware configuration require replacement of the hardware. For example, some previously used techniques include changing hardware configuration with physical changes to the hardware such as, for example, changing pins, jumpers, straps, fuses, etc. It would be beneficial to provide a change or upgrade of a hardware configuration without requiring replacement of the actual hardware or making such physical changes.

Purchases under network traffic do not currently protect privacy at the end points of the transaction. Unique identifiers are currently used for transport of internet purchases, for example. It would be beneficial to allow for a transaction to be anonymous to the seller of the services in order to ensure privacy for the buyer.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

FIG. 11 illustrates a flow and a system according to some embodiments of the inventions.

DETAILED DESCRIPTION

Some embodiments of the inventions relate to provisioning, upgrading, and/or changing of hardware.

Figure 1:
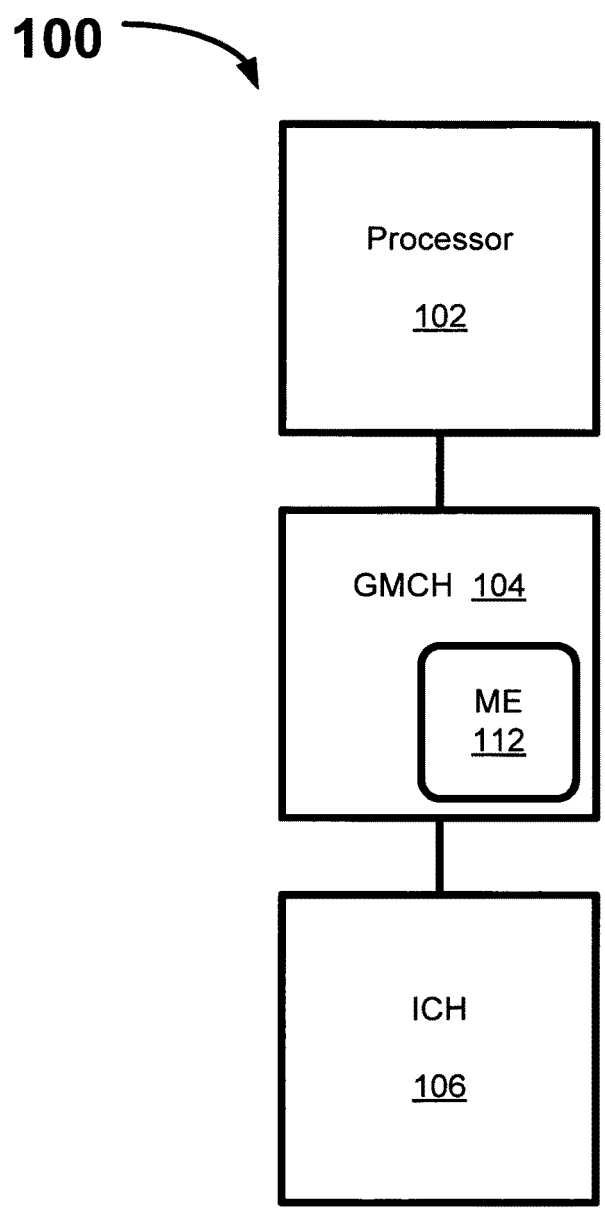
FIG. 1 illustrates a system according to some embodiments of the inventions.

FIG. 1 illustrates a system 100 according to some embodiments. In some embodiments system 100 includes a processor 102 (and/or Central Processing Unit or CPU), a Graphics and Memory Controller Hub 104 (and/or GMCH and/or Memory Controller Hub or MCH), and an Input/Output Controller Hub 106 (and/or ICH). In some embodiments, GMCH 104 includes a Management Engine 112 (and/or Manageability Engine and/or ME), which is a microcontroller and/or hardware processing engine. In some embodiments, ME 112 is able to run firmware services and applications, and is in some embodiments the same as or similar to other ME devices described in more detail below.

In some embodiments GMCH 104 contains a memory controller that provides access to the system memory. A small portion of the system memory is used by the ME 112 for its runtime memory needs. This memory is separated from the memory accessed by the operating system (OS) using special hardware mechanisms. In some embodiments, the architecture that creates the separation is called Unified Memory Architecture (UMA). In some embodiments, the ICH 106 contains an Ethernet network controller, network filters, and/or a nonvolatile flash memory controller, among other things. In some embodiments, a wireless Local Area Network (LAN) or WiFi network controller is connected to the ICH 106 via a PCI Express bus, for example. The network controller, wired and wireless LAN, and network filters provide in some embodiments out-of-band (OOB) communication to access to the ME 112. OOB communication allows the ME 112 to communicate over a network without having any dependence on the OS or the drivers that reside therein. OOB communication is capable of working even when the computer is in some states where the OS is not working or is sleeping (for example, when the OS has crashed, or is in a standby state or a hibernate state). The flash controller in the ICH 106 provides access to the flash memory (for example, also referred to as the nonvolatile memory or NVM) located on motherboard of the computer. The NVM houses in some embodiments Basic Input/Output System (BIOS) code, ME code, and/or data, among other things.

The GMCH 104 and ICH 106 communicate in some embodiments with each other using a Direct Media Interface (DMI) bus and/or a Controller Link (CLink) bus. The DMI bus is a chip-to-chip interconnect between the ICH 106 and the GMCH (or MCH) 104. This high speed interface ensures that the Input/Output (I/O) subsystem (for example, PCI Express, Intel High Definition Audio, Serial ATA or SATA, Universal Serial Bus or USB, etc.) receives the necessary bandwidth for peak performance. In some embodiments, the CLink bus is a proprietary interface that can be used even when the computer is in a sleep state or a hibernate state, in addition to being used when the OS is operational.

In some embodiments, GMCH 104 (and/or MCH 104) is coupled directly and/or indirectly to a number of devices including but not limited to one or more displays and/or display ports (for example, CRT, HDMI, TV, LVDS), one or more graphics devices and/or graphics ports, and/or one or more memory devices (for example, Dual In-Line Memory Module or DIMM devices).

In some embodiments, ICH 106 is coupled directly and/or indirectly to a number of devices including but not limited to Peripheral Component Interconnect (PCI) devices and/or PCI buses, Universal Serial Bus (USB) devices and/or USB buses, Serial ATA devices, SPI flash devices, discrete TPM devices, Super I/O devices, SMBus devices, High Definition Audio Devices, PCI Express devices, Local Area Network (LAN) devices, Wide Area Network (WAN) devices, Wireless Local Area Network (WLAN) devices, Wireless Wide Area Network (WWAN) devices, WiMAX devices, flash memory devices, express card devices, etc.

Figure 2:
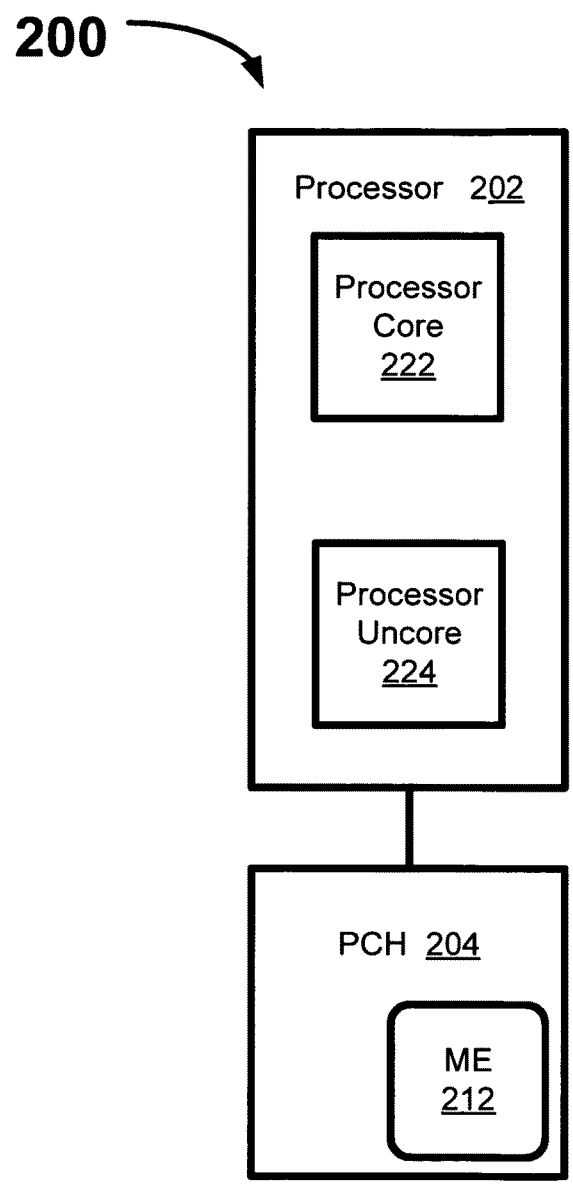
FIG. 2 illustrates a system according to some embodiments of the inventions.

FIG. 2 illustrates a system 200 according to some embodiments. In some embodiments system 200 includes a processor 202 (and/or Central Processing Unit or CPU) and a Platforms Controller Hub 204. In some embodiments, processor 202 includes two or more cores (for example, as illustrated by core 222 and uncore 224 in FIG. 2). In some embodiments, PCH 204 includes a Management Engine 212 (and/or Manageability Engine and/or ME), which is a microcontroller and/or hardware processing engine. In some embodiments, ME 212 is able to run firmware services and applications. In some embodiments, ME 212 is the same as or similar to ME 112 and/or to other ME devices described in more detail below.

In some embodiments, the processor 202 and the PCH 204 communicate with each other using a Direct Media Interface (DMI) bus. This high speed interface ensures that the Input/Output (I/O) subsystem (for example, PCI Express, Intel High Definition Audio, Serial ATA or SATA, Universal Serial Bus or USB, etc.) receives the necessary bandwidth for peak performance. In some embodiments, the PCH 104 performs many or all of the functions and features and/or has many or all of the connected devices as described above in reference to ICH 106. In some embodiments, some of the functions, features, and/or connections described above in reference to GMCH 104 are moved to the processor 202 and some are moved to the PCH 204.

In some embodiments, processor 202 is coupled directly and/or indirectly to a number of devices including but not limited to one or more displays and/or display ports (for example, CRT, HDMI, TV, LVDS), one or more graphics devices and/or graphics ports, and/or one or more memory devices (for example, Dual In-Line Memory Module or DIMM devices).

In some embodiments, PCH 204 is coupled directly and/or indirectly to a number of devices including but not limited to Peripheral Component Interconnect (PCI) devices and/or PCI buses, Universal Serial Bus (USB) devices and/or USB buses, Serial ATA devices, SPI flash devices, discrete TPM devices, Super I/O devices, SMBus devices, High Definition Audio Devices, PCI Express devices, Local Area Network (LAN) devices, Wide Area Network (WAN) devices, Wireless Local Area Network (WLAN) devices, Wireless Wide Area Network (WWAN) devices, WiMAX devices, flash memory devices, express card devices, etc.

Figure 3:
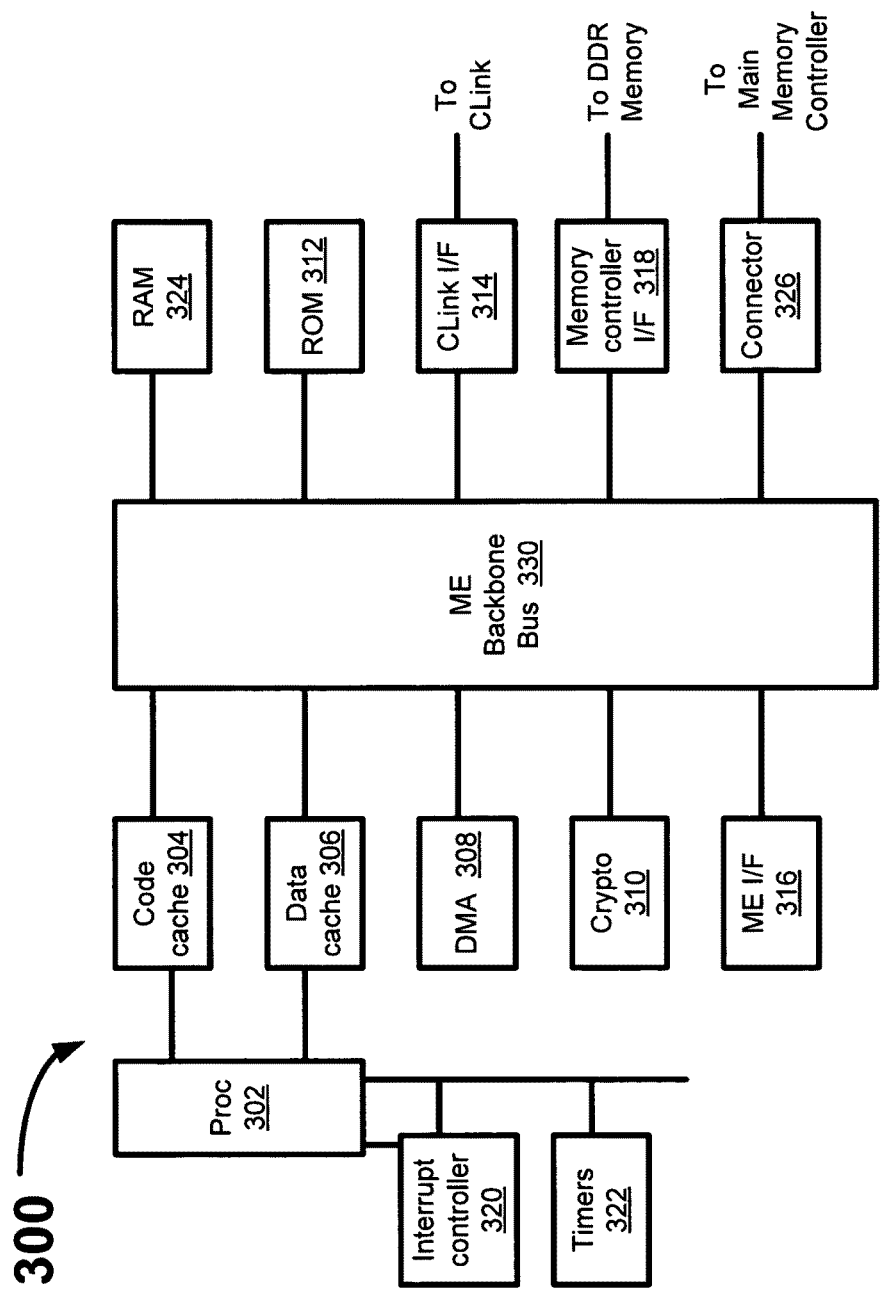
FIG. 3 illustrates a system according to some embodiments of the inventions.

FIG. 3 illustrates a Manageability Engine, Management Engine and/or ME 300 according to some embodiments. In some embodiments, ME 300 is the same as or similar to other ME devices described herein (for example, in some embodiments ME 300 is the same as or similar to ME 112 and/or ME 212 described above). In some embodiments, ME 300 includes a processor (for example, an ARC processor) 302, a code cache 304, a data cache 306, a direct memory access (DMA) engine 308, a crypto engine 310, a read only memory (ROM) 312, a Controller Link (CLink) interface 314, a Management Engine interface 316, a memory controller interface 318, an interrupt controller 320, high precision and/or watchdog timers 322, internal random access memory (and/or SRAM) 324, and/or a connector 326 to a main memory controller, which are coupled together over an ME backbone bus 330.

The code cache 304 and data cache 306 help to accelerate ME functionality by reducing memory accesses to system memory. The DMA engine 308 helps the ME 300 to move data to and from the OS memory and ME UMA (Unified Memory Architecture) memory. The DMA engine 308 is only accessible by the ME 300, and is not accessible by the OS. Further, the ME 300 does not provide any generic interfaces to the OS to access the DMA engine 308. The crypto engine 310 provides hardware offloads to accelerate the cryptographic operations done inside the ME 302 for secure communication protocols such as, for example, wireless security, HTTP security via TLS, etc. The initial boot code for the ME 300 is located and executed from the ROM 312. In some embodiments, the CLink interface 314 is used for communication between the GMCH and ICH in low power states such as sleep or hibernate, some ME specific devices in the ICH communicate with the ME 300 exclusively over CLink, while some devices can communicate over DMI as well as CLink (for example, the network controller).

A small portion of the main system memory is used by the ME 300 for its runtime memory needs. This separation is done using the UMA mechanism. In some embodiments, an integrated graphics controller in the GMCH also uses the same mechanism to use a portion of the main system memory for its needs. In some embodiments the size of this memory is 16 MB, which is less than 1% of the total system RAM in a computer having 2-3 GB of DRAM. From the perspective of the OS the Graphics UMA memory portion will appear to be a little larger than that of computers that do not have an ME.

In some embodiments, ME 300 uses a NOR flash nonvolatile memory (NVM) that is present on the motherboard for persistent storage of the code, configuration, user data, etc. The NVM is also used to store the BIOS code and other OEM specific data. The NVM is divided into specific regions, including separate regions for the ME, the BIOS, and the network controller, for example. The NVM contains an access control descriptor (for example, at the very beginning and/or address 0 of the NVM) which specifies the permissions for accessing the various regions of the NVM. The ICH hardware ensures that these permissions are enforced. The controller that the ICH uses for accessing the flash is based on Serial Peripheral Interface (SPI). The ME region of the flash is further divided into regions for code, recovery code, internal configuration data and variable storage, event logs, and user/ISV relevant data.

In some embodiments, in desktop platforms only the Ethernet network adapter is connected to the ME 300. In some embodiments, in mobile platforms the ME 300 has access to both Ethernet and WiFi network controllers (for example, both when the OS is function and when it is not functional such as when the system has crashed, is sleeping, etc). Network controllers such as Ethernet and Wi-Fi controllers communicate in some embodiments with the ME 300 using the CLink interface, and the ME accesses traffic differently from an Ethernet controller (for example, a Gigabit Ethernet controller) than from a Wi-Fi controller. The ME sends and receives traffic directly over the Ethernet controller without using the OS. In some embodiments of Wi-Fi, however, the network controller has a single master and when the OS is operational the WiFi traffic is routed to the ME via the WiFi driver in the OS. However, when the OS crashes or goes to sleep, the ME assumes ownership of the WiFi network controller and performs the communication directly.

Remote communication with computers may be implemented from a management console (for example, using HTTP and other protocols) over these interfaces. The ME firmware can share a common LAN MAC, hostname, and IP address with the OS, helping to minimize IT infrastructure cost.

In some embodiments, out-of-band (OOB) communications architecture of the ME supports ARP, DHCP, and IP port filters, for example. The OOB communications architecture supports ARP by forwarding ARP packets containing a specific IP address to the host and/or ME. The OOB communications architecture supports DHCP by forwarding DHCP offer and ACK packets to the host and/or the ME. The OOB communications architecture supports IP port filters (for example, HTTP and redirection) by redirecting incoming IP packets on a specific port to the ME.

In some embodiments, the ME ROM (for example, ROM 312) is masked into the silicon of the GMCH chip. The ROM contains the reset vector (the very first set of instructions to execute after the ME is reset). The ROM is only accessible by the ME and not by the host or the OS. Since the ROM code is masked in the chip during manufacturing, it can never be changed and is therefore secure. The ROM is used, for example, to configure ME memory areas, initializing certain hardware pieces, checking the integrity and signature on the firmware image on the flash, and transferring control to the firmware image. In some embodiments, the ROM is the root of trust of the ME firmware.

In some embodiments, an ME kernel module is composed of services and drivers that provide the base functionality of the ME environment. The kernel provides the basic set of services that are expected for any general purpose execution environment. For example, in some embodiments, these services include bootstrap and initialization, task and thread management, memory management, interrupt management, timers, messaging and events/event monitoring, security and cryptographic functions, drivers for local and network interfaces, storage, etc., power management, interface discovery, and/or firmware update.

Since the ME houses some very security-sensitive technologies (for example, the Trusted Platform Module or TPM), it is necessary to provide a high degree of separation and isolation from the kernel level between the highly security-sensitive applications and others. Therefore, the kernel is partitioned into privileged and non-privileged portions in some embodiments. The privileged portion includes the ROM, the initialization modules such as loader and bring-up modules, a portion of the kernel called the privileged kernel, and TPM firmware. The non-privileged portion includes the remaining portion of the kernel called the non-privileged kernel, support modules, common services modules, and other firmware applications. Firmware that executes in privileged mode has access to privileged hardware resources such as certain memory ranges and certain hardware registers. Non-privileged firmware that attempts to access privileged resources will cause and exception or interrupt to occur. A register in the ME contains the address of the code for entering and exiting out of the privileged mode.

In some embodiments, ME 300 has access to a special purpose clock on the chipset called a Protected Real Time Clock (PRTC) that is not accessible by the OS and is only accessible by the ME.

Figure 4:
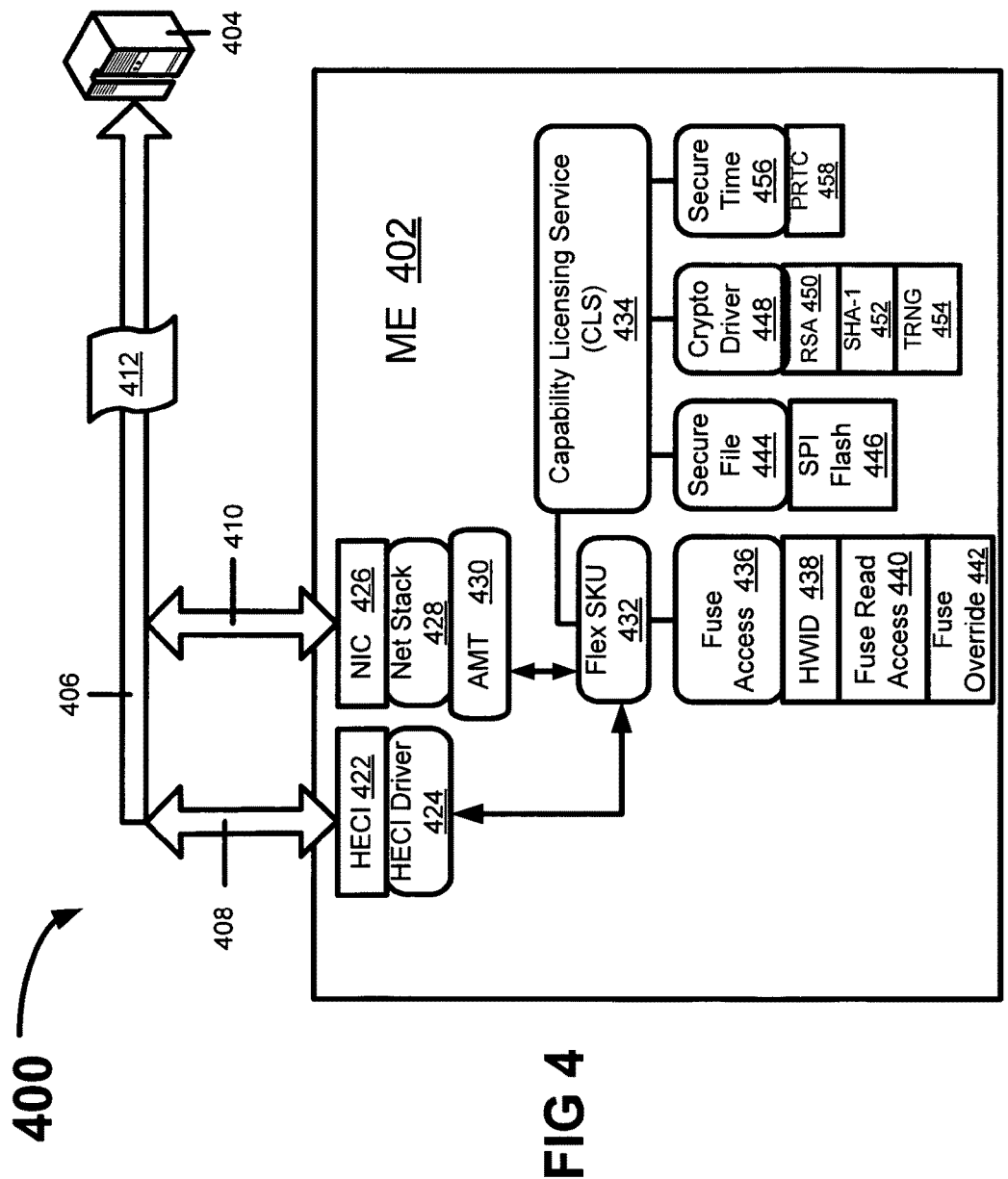
FIG. 4 illustrates a system according to some embodiments of the inventions.

FIG. 4 illustrates a system 400 according to some embodiments. In some embodiments, system 400 includes a Manageability Engine (and/or Management Engine and/or ME) 402 coupled to a permit server 404 (for example, one or more business to business servers or B2B servers) via the internet 406. A permit 412 is transferred between the ME 402 and the permit server 402. ME 402 is coupled to the internet via host communication link 408 and/or out of band (OOB) network communication link 410.

In some embodiments, ME 402 includes a Host to Embedded Controller Interface (HECI) 422, a HECI driver 424, a Network Interface Card (NIC) 426, a network stack 428, Active Management Technology (AMT) 430, flexible SKU 432, Capabilities and Licensing Services (CLS) and/or Intel Capabilities and Licensing Services (iCLS) 434, fuse access 436, hardware identifier (HWID) 438, fuse read access 440, fuse override 442, secure file system 444, Serial Peripheral Interface (SPI) flash 446, cryptographic driver 448, Rivest Shamir Adleman (RSA) key based encryption 450, Secure Hashing Algorithm version 1 (SHA-1) 452, True Random Number Generator (TRNG) 454, secure time 456, and/or Protected Real Time Clock (PRTC) 458. In some embodiments, HECI 422, NIC 426, HWID 438, fuse read access 440, fuse override 442, SPI flash 446, RSA 450, SHA-1 452, TRNG 454, and/or PRTC 458 are implemented in hardware. In some embodiments, HECI driver 424, network stack 428, AMT 430, flexible SKU 432, CLS 434, fuse access 436, secure file system 444, crypto driver 448, and/or secure time 456 are implemented in firmware.

In some embodiments, system 400 illustrates building block and data structure that may be used to perform secure operations between ME 402 and a signing server. According to some embodiments, permit 412 is a data structure binary that provides authentic feature information to the ME system. In some embodiments, permit server 404 is a back-end infrastructure server (or servers) capable of generating a permit such as permit 412. In some embodiments, ME firmware runs on ME 402 that includes several components. For example, in some embodiments, CLS 434 validates and parses permits to provide information to CLS plug-ins such as the Flex SKU 432 and/or SaaS/SMT (not illustrated in FIG. 4). In some embodiments CLS plug-ins such as Flex SKU (or other CLS plug-ins such as SaaS) accomplish specific features of the ME. In some embodiments, firmware services and drivers are used to provide essential services to CLS 434 and CLS plug-ins. In some embodiments, external interface firmware components allow the ME to interface with external entities via those external interface components (for example, AMT 430, HECI driver 424, network stack 428, etc).

In some embodiments, HWID 438 is a unique identifier in each chipset created during the manufacturing process of the chipset in the chipset hardware (for example, implemented as fuses in the chipset). In some embodiments, fuse read access 440 is hardware logic used to read the fuses in the chipset. In some embodiments, fuse override 442 is a mechanism by which the hardware overrides the actual fuses with a supplied bitmap during some point in the initialization of the chipset hardware. In some embodiments, fuse access 436 is firmware logic that implements the fuse reading and overriding mechanisms to the CLS 434 firmware component. In some embodiments, SPI flash 446 is a non-volatile storage mechanism (for example, NOR based flash) that is accessible from the chipset using the SPI protocol (and therefore connected to an SPI controller in the chipset). In some embodiments, RSA 450 is a hardware unit in the chipset that helps in accelerating RSA computation via hardware based add and multiply circuits (and in some embodiments, the rest of the RSA logic is implemented in firmware). In some embodiments, SHA-1 452 is a hardware unit in the chipset that implements an SHA-1 algorithm. In some embodiments, TRNG 454 is a hardware unit in the chipset that generates unique random numbers in the chipset using a thermal noise concept, for example. In some embodiments, crypto driver 448 is a firmware driver that provides crypto operations as usable interfaces (for example, RSA-2048 sign, encrypt, verify, decrypt, SHA-1 hash generate, TRNG generate, etc) to other firmware components such as, for example, CLS 434.

In some embodiments, PRTC 458 is a protected clock that keeps time that is not modifiable by host OS software, thereby providing a more secure notion of time to ME firmware components such as the CLS 434. In some embodiments, the ME (for example, ME 112, ME 212, ME 300, and/or ME 402) has access to a special purpose clock on the chipset (for example, PRTC 458). This clock is only accessible by the ME and is not accessible by the OS. The ME uses this clock for its time related verifications (such as certificate validations, Kerberos time stamp checks, etc) rather than relying on the system Real Time Clock (RTC). The RTC can be changed (backdated or moved forward) by the user or malware in the OS. Therefore, the ME does not rely on the RTC. In some embodiments, the PRTC is powered by a battery so that the PRTC maintains the time even when the computer is completely powered off. In some embodiments, when a system is provisioned in a small business mode, for example, the ME clock is synchronized with the BIOS clock at boot time, and both generally represent the local time. In some embodiments, for example, when a system is provisioned in an enterprise mode, the clocks are separate and it the PRTC clock in the ME is set, for example, to GMT time.

In some embodiments, an ME includes a True Random Number Generator (for example, such as TRNG 454) which is based on thermal noise variants. The TRNG is very helpful in assisting in cryptographic transactions such as generating random session keys, tokens, nonces, etc. The TRNG outputs 32 bit random numbers at a time, for example.

Many cryptographic algorithms and mechanisms make use of random numbers. An important feature of a random number generator (RNG) is its entropy, which is the measurement of the inability of an external viewer to predict the next number that will be generated by the RNG, even if the viewer knows all of the previously-generated random numbers by that generator. A pseudo-RNG (PRNG) may be used which is a deterministic algorithm that produces the next random number based on the current generator's state. Such an algorithm maintains a high level of entropy as long as the initial state (or "seed state") of the PRNG is not known. Some PRNG implementations seed themselves using a value of one of the platform clocks. This value can be somewhat unpredictable due to the high resolution of the clock, and therefore makes a reasonable seed for the PRNG that is suitable for applications requiring a moderate level of security. However, given that a large number of platforms power up at the same time (a time that may be known to within a few minutes or seconds), this could help a potential attacker to narrow down the possibilities and therefore crack the PRNG seed state, allowing prediction of the next numbers generated by the PRNG. An attacker could also learn from the generated numbers from one hacked platform to break other platforms in the enterprise (also known as a BORE attack: "Break Once, Run Everywhere").

In some embodiments, a true random number generator (TRNG) such as TRNG 454 may be a TRNG hardware device. In some embodiments, such a TRNG may be based on two resistors that produce a thermal noise. The noise is amplified and provided as input to a frequency-modulated low-frequency oscillator. Combined with a high-frequency oscillator, a nearly-random bitstream is produced. A voltage regulator controls the hardware components to avoid any bias based on voltage. Additionally, a logic block attempts to correct the bitstream of any bias that may have been inserted (for example, due to an imperfect duty cycle of the oscillator) by using a standard anti-bias correction algorithm.

In some embodiments, a PRNG may be implemented for the TRNG, where the state of the PRNG is occasionally reset to initialize to a state generated by the TRNG. This creates a powerful high-quality RNG that is able to keep up with the high usage of random numbers in the subsystem.

In some embodiments, the chipset has a key (for example, a 128 bit key) for use by firmware in symmetric encryption and integrity protection operations. This key is generated during manufacturing of the chipset by randomly blowing fuses dedicated for this purpose. The ME is the only component that can access this keying material, and it provides the root of trust for several ME operations. No device outside of the ME knows the value of this key. In some embodiments, a chipset fuse key is used that is unique to each system, and is known only by the firmware, for example. According to some embodiments, the chipset fuse key is a set of 128 fuses in the chipset. Each fuse is blown or un-blown, corresponding to a 0 or 1 value. The status of each of the fuses (0 or 1) is determined at manufacturing. A random subset of the fuses is blown on the chipset manufacturing line, while the rest remain un-blown. Thus, a random unique value is created for each chipset. The 128-fuse set thus creates a 128-bit key (or a key with any other number of bits depending on the number of fuses).

In some embodiments, encryption of secrets is achieved using standard encryption techniques, but the interesting feature is the key that is used for the encryption. The encryption key needs to be stored in some nonvolatile form, but the flash itself is not a good place to store it (otherwise the attacker would first read this key from the flash and then use it to decrypt the rest of the protected data in the flash). Therefore, in some embodiments, firmware derives the encryption key from the chipset fuse key, and uses this encryption key to encrypt the sensitive items being place on the non-volatile flash. Since secure firmware (for example, ME firmware) is the only entity that has knowledge of the chipset fuse key (and therefore the encryption key and the integrity protection key), even if the attacker pulls out the flash portion from the system and tries to read it directly, all he sees is the encrypted and/or integrity protected data.

According to some embodiments, a permit server (for example, such as permit server 404) is located remotely on a network from an ME (for example, ME 112, ME 212, ME 300, and/or ME 402). In some embodiments, a permit server (for example, such as a permit server 404) is a trusted provisioning server that creates authenticated permits to be used by an ME (for example, ME 112, ME 212, ME 300, and/or ME 402). The permit server has secure access (for example, via one or more hardware signing modules and/or HSM) to a cryptographic RSA (Rivest Shamir Aldeman) private key, whose public component is embedded in the signed ME firmware. In some embodiments, the hardware signing module (HSM) is FIPS-140-2 Level 3 compliant. In some embodiments, the HSM is a PCI card installed in a signing server. In some embodiments, the HSM is tamper resistant, provides active monitoring, destroys keying material in the event of tampering, protects a permit signing key, executes permit signing code, and/or accounts for permit purchases.

In some embodiments, the permit server can create permits that the ME can authenticate as having originated from a trusted entity. The permit server embeds hardware fuse override information in a signed permit (for example, such as permit 412), which the ME consumes to implement a soft SKU process. In some embodiments, one or more servers perform the operations described herein relating to a permit server, depending upon implementation of infrastructure and transfer capacity requirements, for example.

In some embodiments, a permit (for example, such as permit 412) is a signed data structure containing hardware fuse override information. In some embodiments, no one other than one entity (for example, the owner of the permit server) can create a permit that can be successfully validated by an ME (for example, ME 112, ME 212, ME 300, and/or ME 402). The permit also contains, for example, a class and subclass identifier to indicate the interpretation of the rest of the data structure. The permit also contains, for example, a time stamp indicating when the permit was created (for example, in a "Timestamp" field). The permit also contains, for example, some attributes (for example, in a "Flags" field) that indicate some permit characteristics such as, for example, whether or not the system will reboot immediately after permit installation.

In some embodiments, a Manageability Engine, Management Engine, and/or ME (for example, such as ME 112, ME 212, ME 300, and/or ME 402) is, among other things, a hardware engine that executes programming of a fuse override mechanism. The ME runs, for example, signed/authenticated and verified firmware code. This ME firmware is capable of interacting with user code executing in the operating system (OS). The user code can interact with the ME firmware code to program hardware fuse override registers. The ME firmware ensures that all conditions are met (for example, including permit validation) before it changes the values in the hardware fuse override registers. The ME also executes its end of the permit installation protocol.

In some embodiments an ME uses a permit signing key pair (for example, a symmetric RSA key pair) for permit signing and verification. The private portion of this key pair is possessed by a company such as a manufacturer of the ME, and resides in a secure data center facility of that company (for example, in a computer using a hardware signing module or HSM). The public portion of the key is maintained in a signed ME firmware image that cannot be changed by anyone. Permits are signed by the private portion of the key pair, and the public portion of the key is used by an ME to verify the signature.

In some embodiments, a SafeID system of keys is implemented in which every ME has a unique SafeID private key burned into the chipset as fuses during a manufacturing process of the chipset. The ME never allows any external access to this key. The group portion of the key is possessed by a company such as the manufacturer of the chipset and resides in a permit server system located in a data center of that company. The SafeID key in the chipset is used to create a signature (on a timestamp and a nonce, for example) which is verified by the permit server using the group key. This assures the permit server that the signature was performed by a true and valid ME.

In some embodiments, the chipset fuse key is a symmetric key that is unique for every chipset (and/or for every chipset part). It is uniquely programmed into every chipset during a manufacturing process by randomly flowing fuses in a program and forget manner. No one (including the manufacturer of the chipset or chipset part) has knowledge of this key, and the ME never allows this key to be externally accessed from the ME.

Figure 5:
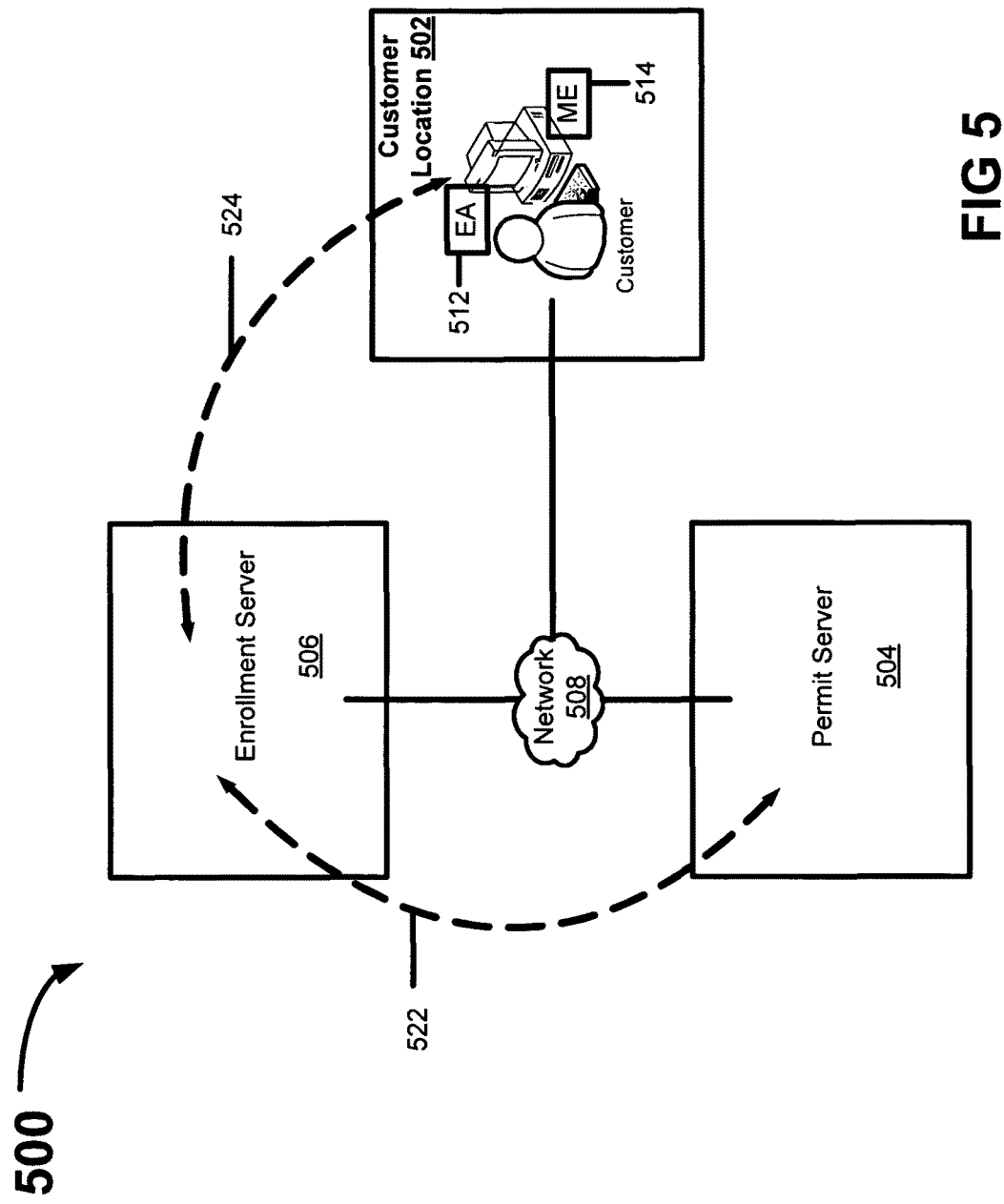
FIG. 5 illustrates a system according to some embodiments of the inventions.

FIG. 5 illustrates a system 500 according to some embodiments. System 500 includes a customer location 502, a permit server 504 (for example, in some embodiments, similar to and/or the same as permit server 404), an enrollment server 506, and a network 508 (for example, the internet). In some embodiments, network 508 couples together customer location 502, permit server 504, and enrollment server 506. In some embodiments, customer location 502 includes a customer, a customer's computing system, an Enrollment Application (EA) 512, and an ME 514. In some embodiments, EA 512 and/or ME 514 are resident on the customer's computing system. In some embodiments permit server (PS) 504 includes one or more business to business (B2B) servers and/or one or more back end servers. In some embodiments, enrollment server 506 includes one or more business to customer (B2C) servers, one or more ISV servers, and/or one or more front-end servers. In some embodiments, dotted line 522 represents permit order and/or fulfillment transactions (for example, ISV permit order and/or fulfillment transactions between permit server 504 and enrollment server 506. In some embodiments, dotted line 524 represents customer permit order and/or fulfillment transactions between customer location 502 and enrollment server 504. In some embodiments, permit server 504 is the similar to or the same as permit server 404. In some embodiments, ME 514 is the same as or similar to ME 112, ME 212, ME 300, and/or ME 402.

As mentioned above, in some embodiments ES 506 is a B2C server (and/or more than one B2C servers). In some embodiments, ES 506 is more than one server for load balancing. In some embodiments, ES 506 interacts with customers to operate the front end of the purchasing process and to interact with the PS 504 to purchase/receive permits.

In some embodiments, the Enrollment Application (EA) 512 is a local host application or agent that interacts with the enrollment server (for example, ES 506) to perform a customer purchasing process and to request/receive permits. EA 512 also interacts with the ME 514 to install permits in an in-band manner. For purposes of the permit installation protocol, in some embodiments the EA 512 acts for the most part as a pass through agent between the ME 514 and the back-end (for example, the Permit Server 504 and the Enrollment Server 506). The EA 512 does interact with the user (customer) to generate payment and transaction information, and to use this information in the permit installation protocol.

In some embodiments, the customer at customer location 502 runs the EA agent 512 to purchase a new feature (for example, Flex SKU feature) of the customer's computing system. In some embodiments, the customer may be an end user or may be a corporate IT purchasing agent, for example.

In some embodiments, Enrollment Server 506 is an ISV/MSP/MSP domain responsible for interfacing with the customer (for example, an end user) to accomplish a permit purchase and installation process. In some embodiments, ISV/MSP is used to close the feature sale (for example, implementing transaction initiation, revenue collection, management and support, etc).

In some embodiments, a company with a permit server such as permit server 504 provides the electronic commerce support for ordering, delivering, and invoicing permits, and is the sole source of permits. In some embodiments, the permit server 506 is under direct physical control of that company (for example, the permit server 506 is on the campus of that company, and that company provides support and security for the permit server 506).

In some embodiments, protection is provided against hacking at the end customer and/or product manufacture sites, abuse of user privacy is prevented, unique data is not exposed, fault tolerant operation may be maintained during a field upgrade of CLS firmware and/or permit data, and support for refunds and exchanges is provided for feature upgrades, feature cancellations, and/or trial features, etc.

Figure 6:
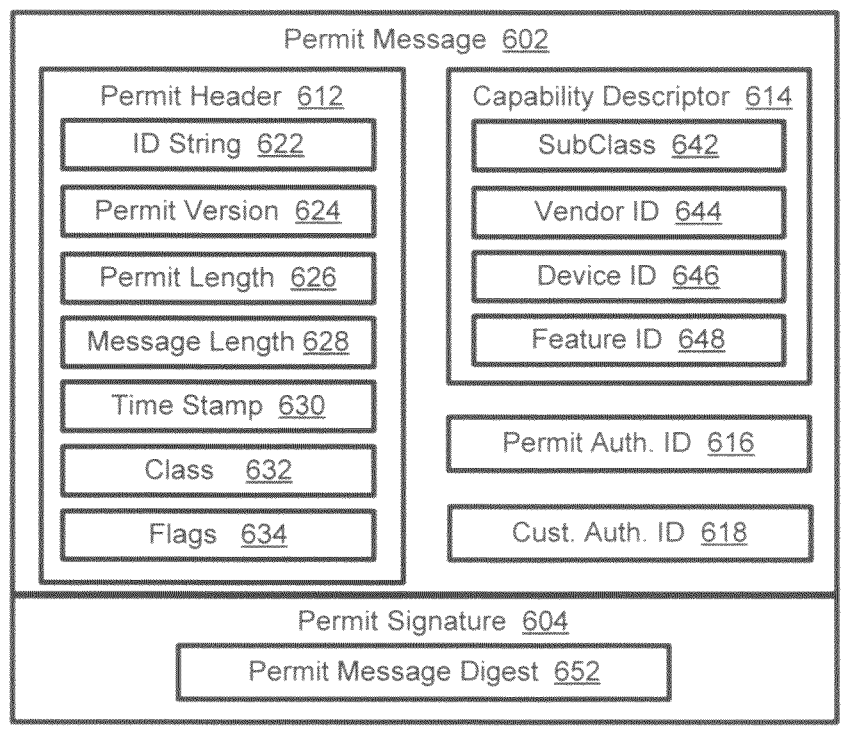
FIG. 6 illustrates a permit according to some embodiments of the inventions.

FIG. 6 illustrates a permit 600 according to some embodiments. In some embodiments, permit 600 includes a permit message 602 and/or a permit signature 604. Permit message 602 includes in some embodiments a permit header 612, a capability descriptor 614, a permit authentication identifier 616, and/or a customer authentication identifier 618. In some embodiments, permit header 612 includes an ID string 622, a permit version 624, a permit length 626, a message length 628, a time stamp 630, a class 632, and/or flags 634. In some embodiments, capability descriptor 614 includes a subclass 642, a vendor ID 644, a device ID 646, and/or a feature identifier 648. In some embodiments, permit signature 604 includes a permit message digest 652. In some embodiments, permit signature 604 and/or permit message digest 652 are signed with an e-commerce private key (for example, RPSK-priv).

Figure 7:
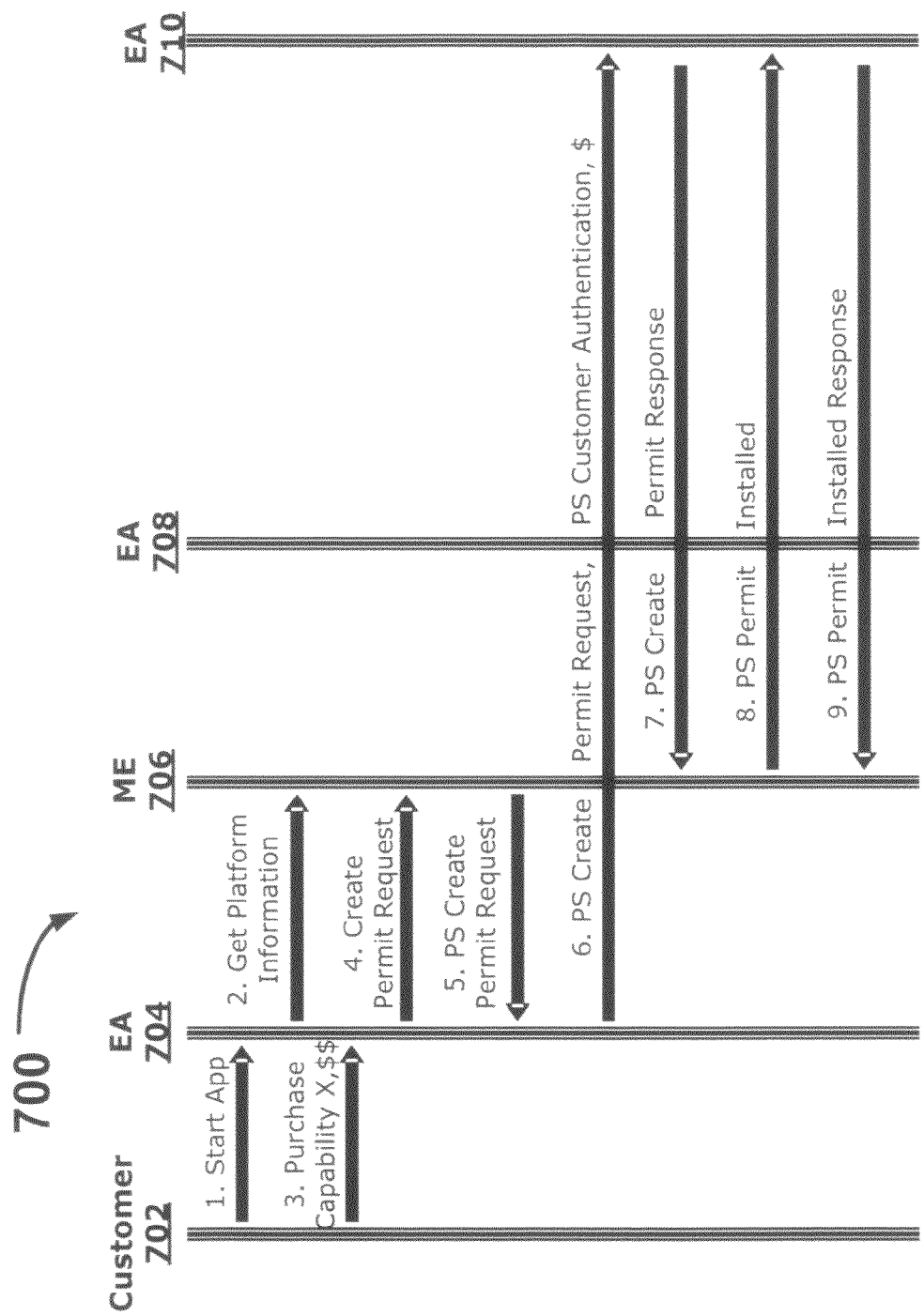
FIG. 7 illustrates a flow according to some embodiments of the inventions.

FIG. 7 illustrates a permit installation protocol 700 according to some embodiments. FIG. 7 illustrates a customer 702, an Enrollment Application (EA) 704, a Management Engine (ME) 706, an Enrollment Server (ES) 708, and a Permit Server (PS) 710, which each participate in the permit installation process according to some embodiments.

In some embodiments, the customer 702 first starts an application with the EA 704. Then the EA 704 obtains platform information from the ME 706. The customer 702 then sends purchase capabilities such as monetary amounts to the EA 704. Then the EA 704 creates a permit request with the ME 706. The ME 706 then sends a message to the EA 704 for the PS 710 to create a permit request. The EA 704 then sends a message to the PS 710 relating to creating a permit request, PS customer authentication, and/or monetary amounts. The PS 710 then sends a message to ME 706 that it is creating a permit request. Then the ME 706 works with the PS 710 to install a permit. The PS 710 then sends a response to the ME 706 that the permit is installed.

According to some embodiments, a permit installation protocol is described as follows:

| Step | Actor | Description |
|------|-------|-------------|
| 1 | Customer | Customer starts EA |
| 2 | EA | EA queries ME for installed Permits and presents options to the customer. |
| 3 | Customer | Customer finds he has no Permits installed and decides to purchase capability X for his PC. Note: Purchased amount is recorded by ecommerce server. Will be used later to populated $ amount in CAID field by the PS. |
| 4 | EA | Create Permit Request command to the ME to create Permit X. |
| 5 | ME | ME constructs PS Create Permit Request message and sends it as a response to the EA<br>1. ME creates Permit Authentication ID (PAID) using the Chipset Fuse Key to bind the permit to this computer<br>2. ME creates new Permit X body (unsigned). Permit X body is an object that contains PAID, and Timestamp.<br>3. ME generates a random value RAND1<br>4. ME creates SafeIDBlob = RSA Encrypt {RPSK-pub, "I am an ME" \|Current UTC time \| SafeIDSign("I am an ME" \| Current UTC time)}<br>5. ME creates M1 = PS Create Permit Request \| RAND1 \| Permit X \| SafeIDBlob<br>6. ME sends M1 to EA |
| 6 | EA | EA constructs PS Customer Authentication message and sends it and PS Create Permit Request message to the Permit server.<br>1. Customer (EA) has a Customer_Auth_Key. CAID is per transaction.<br>2. Customer computes CAID = Hash(Customer_Auth_Key, CustomerAuthMessage).<br>3. EA/ES creates M2 = RSA encrypts (RPSK-pub, PS Customer Authentication \| CAID)<br>4. EA sends M1 and M2 to backend (ES/PS) |
| 7 | PS | PS decrypts and validates EA messages and constructs PS Create Permit Response message to the ME.<br>1. PS decrypts M2 with RPSK-priv<br>2. PS inserts CAID from M2 and $$ into Permit X message body. Now Permit X contains PAID, CAID, and Timestamp from ME. Other information in Permit X includes permit version, permit length, capability descriptions, permit ID, flags, etc.<br>3. PS verifies $ from EA/ES, verifies contents of Permit X then signs Permit X. PS needs to verifies and update the timestamp information in Permit X.<br>4. PS decrypts the SafeIDBlob using RPSK-priv, and verifies SafeID signature using the well known string "I am an ME" and the Current UTC Time. PS also verifies if the UTC time is within a +/−48 hour range.<br>5. PS creates M3 = RSA signs message (RPSK-priv, PS Create Permit Response \| RAND1 \| RAND2 \| Permit X).<br>6. PS sends M3 to ME (via EA) |
| 8 | ME | ME installs Permit X and constructs PS Permit Installed message to the PS.<br>1. ME validates M3 using RPSK-pub. The following items are at minimum verified:<br>  a. Signature<br>  b. PAID<br>  c. Feature<br>  d. RAND1<br>  e. Flags<br>2. ME creates response M4 = RSA encrypt (RPSK-pub, PS Permit Installed \| RAND2 \| RAND3 \| Permit (X) \| PAID_Auth_Key(x) \|PAID_Auth_Key(null)\| "Intel CLS Permit" \| SafeIDSign(RAND2 \| RAND3))<br>  a. M4 is used by PS to close invoice pending when generating M3<br>  b. PAID_Auth_Key(null) is a container of equal size to PAID_Auth_Key(x) of value "0x0". It is placed to ensure M4 implmentations for both firmware and PS follows same code path for M4 generation.<br>3. ME stores RAND2 in secure flash, for fault tolerance requirements upon request ME will regenerate M4 message using a new nounce for RAND3. This is done to prevent privacy abuse of M4 value. ME stores Permit X in the secure flash file system. This action as upgrade operation Permit(x) = NewPermit and CurrentPermit = Null. If a power failure or any other fault occurs the system will revert to Null permit base functionality. Notice payment confirmation is not yet issued but feature is not yet available. That will happen in the following steps.<br>4. ME sends M4 to PS via EA/ES |

-continued

| Step | Actor | Description |
|---|---|---|
| 9 | PS | PS confirms message M4 from ME and PS constructs Permit Installed Response message and sends to ME. Payment gores thru after the Permit Server receives M4.<br>1. PS verifies the SafeID signature on RAND2 | RAND3.<br>2. PS generates PAID from data (PAID_Auth_Key(x)) in M4 and checks if it matches PAID in Permit<br>3. PS creates message M5 = RSA sign (RPSK-pub, PS Permit Installed Response | RAND3 | RAND4)<br>4. PS destroys RAND3 |
| 10 | ME | ME validates M5 and erases RAND2. ME installs Permit X, replacing the Manufacturing Test Permit or Trial Permit and activating the feature in next system reboot.<br>Note: Until M5 arrives the feature is not confirm paid. Therefore ME will wait for M5. For fault tolerance operation any prior configuration for Manufacturing, Trial or Upgrade should be retained until M5 arrival |

As discussed previously, in some embodiments a SafeID system of keys is implemented in which every ME has a unique SafeID private key burned into the chipset as fuses during a manufacturing process of the chipset. The ME never allows any external access to this key. The group portion of the key is possessed by a company such as the manufacturer of the chipset and resides in a permit server system located in a data center of that company. The SafeID key in the chipset is used to create a signature (on a timestamp and a nonce, for example) which is verified by the permit server using the group key. This assures the permit server that the signature was performed by a true and valid ME.

The use of a SafeID key system assures the permit server that it is talking to a true ME and not an impersonator of an ME. This is because only the ME has knowledge of the SafeID private key and the ME signs a timestamp value in the M1 message, for example, and later signs (RAND2|RAND3) in M4. When the PS verifies the SafeID signature on M1, it knows that it is talking to a true ME, unless the message was replayed in the last 48 hours. However, when the PS receives M4, it confirms that it is talking to a true ME on the basis of verifying the SafeID signature on (RAND2|RAND3).

According to some embodiments, a process for installing a permit on a computer is described below. The flow of this process presumes according to some embodiments a customer initiated transaction (that is, for example, the customer is selecting a particular upgrade and is paying for it using a credit card), and the permit is then installed on the computer of that customer. A Management Service Provider (MSP) initiated transaction is also possible according to some embodiments in which a management application communicates with a corresponding console application to directly initiate the permit installation process in a manner that does not involve the end user of the computer.

| Step | Component | Role Description |
|---|---|---|
| 1 | Customer | Customer double clicks on EA and browses for available features which the customer's client platform supports. |
| 2 | Enrollment Application | The EA queries the ME to determine what features may be soft SKU'd and if a Permit is currently installed. The Enrolment Application will present coherent options to the customer to prevent the customer from purchasing a Permit for a feature that is not supported by the current configuration. |
| 3 | Customer | Customer makes purchasing decision and communicates his preferences to the EA. The EA and submits financial information (credit card #, billing information, etc.) to the ES (hosted by ISV/MSP) along with the feature the customer wants to purchase. |
| 4 | Enrollment Application | The EA communicates with the ME to generate a Permit Creation request and sends this request along with the financial information to the ES. |
| 5 | Enrollment Server | The ES confirms information and may pre-authorize the sale with the credit card company. |
| 6 | Enrollment Server | The enrolment server sends a P.O. to the Intel Permit Server(s) back-end infrastructure. |
| 7 | Permit Server | The Permit Server authorizes the purchase based upon ISV/MSP, generates, signs, and returns the Permit to the Enrolment Server, and then invoices the ISV/MSP for the Permit. |
| 9 | Enrollment Server | The Enrolment Server sends the Permit to the Enrolment Application and afterwards completes billing the customer for the Permit. |
| 10 | Enrollment Application | The Enrolment Application installs the Permit on the client system by sending the Permit to the ME. |
| 11 | Management Engine | The ME validates the Permit and stores it in the ME region of flash. Upon the next system restart the ME enables the features from the Permit. |

In some embodiments, a private portion of a permit signing key pair and a public portion of the permit signing key pair are together an RSA key pair. The private portion of the permit signing key pair is located at the permit server and the public portion of the permit signing key pair is located in the chipset ROM.

In some embodiments, a group portion of a SafeID key and a private portion of the SafeID key are together a pair of ECC based SafeID keys. The group portion of the SafeID key is located at the permit server and the private portion of the SafeID key is located in chipset fuses. In some embodiments a chipset fuse key is also located in chipset fuses.

Figure 8:
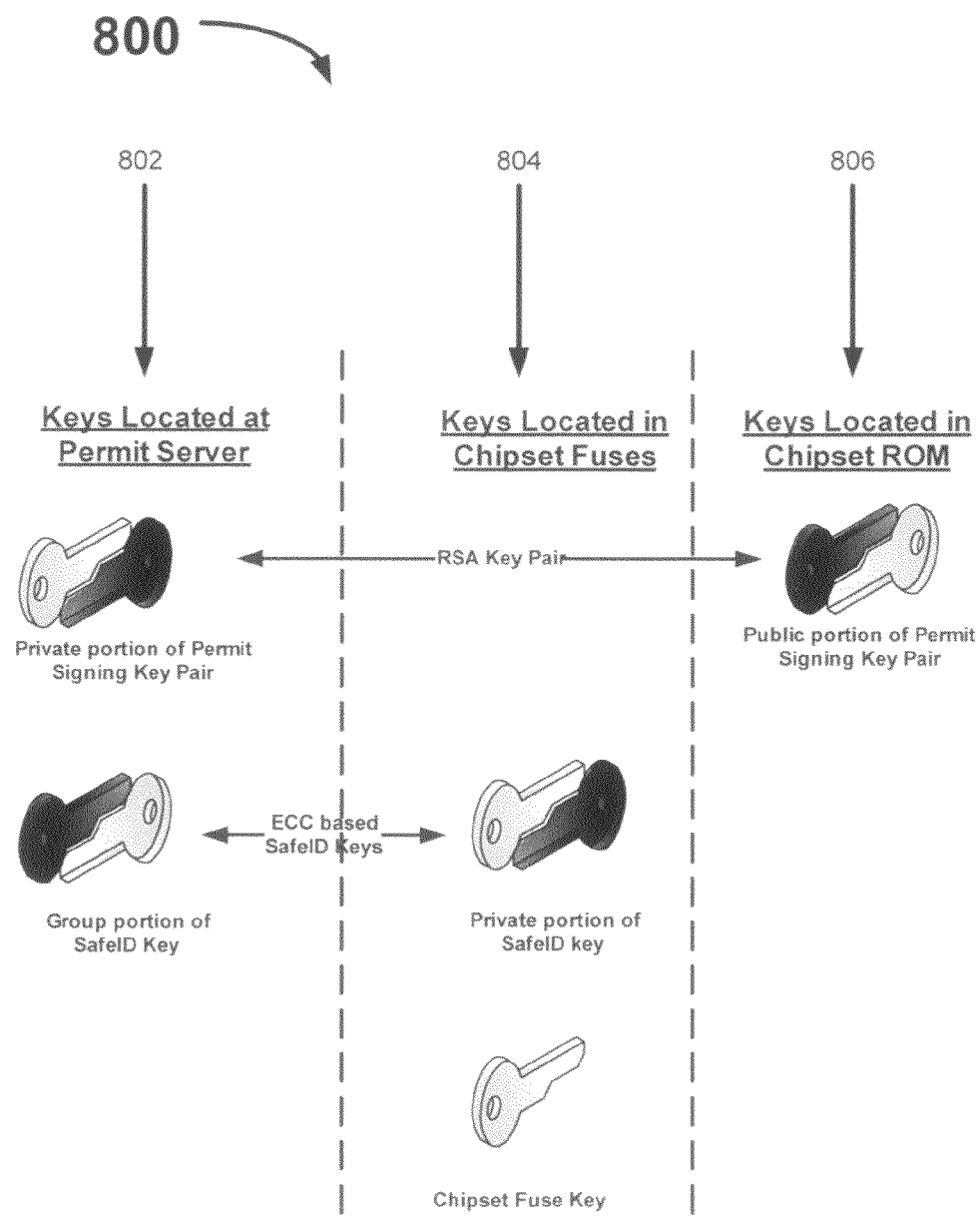
FIG. 8 illustrates key locations according to some embodiments of the inventions.

FIG. 8 illustrates key infrastructure 800 according to some embodiments. As illustrated in FIG. 8, keys 802 located at the permit server include a private portion of the permit signing key pair and a group portion of the SafeID key, keys 804 located in chipset fuses include a private portion of the SafeID keys and a chipset fuse key, and keys 806 located in the chipset ROM include a public portion of the permit signing key pair.

In some embodiments, a firmware signing key (FWSK) is an RSA 2048 bit key pair (for example, an asymmetric key pair including FWSK-private and FWSK-public). The FWSK is used to sign one or more firmware (FW) modules. The ROM validates the signature to ensure the integrity of the FW module (that is, that it came for the correct manufacturing company and that it has not been modified. The FWSK-priv key is stored in a key vault within code signing system facilities (for example, the manufacturing company). The FWSK-pub key is located in the masked ROM of the ME. The FWSK-pub key is used to verify the signature of arriving firmware before installation and execution.

In some embodiments, a root permit signing key (RPSK) is an RSA 2048 bit key pair used to sign permits (for example, an asymmetric key pair including RPSK-private and RPSK-public). The RPSK-priv key is stored in a key vault within permit signing facilities of a company (for example, a manufacturing company). The RPSK-pub key is located as part of the ME firmware (and signed by FWSK-priv). RPSK-pub is used to verify the signature of the arriving permits signed by RPSK-priv.

In some embodiments, a chipset fuse key (CFK) is a random per unit symmetric key (for example, of 128 bits). The CFK is "burned" in fuses as part of the manufacturing process. The CFK is used as the root key for the ME to generate other symmetric keys during run time (including a chipset storage key or CSK). In some embodiments, a chipset storage key (CSK) is a random symmetric key (for example, of 128 bits). The CSK is generated in the ME using the CFK. The CSK is used to encrypt data to be stored in the flash memory.

Figure 9:
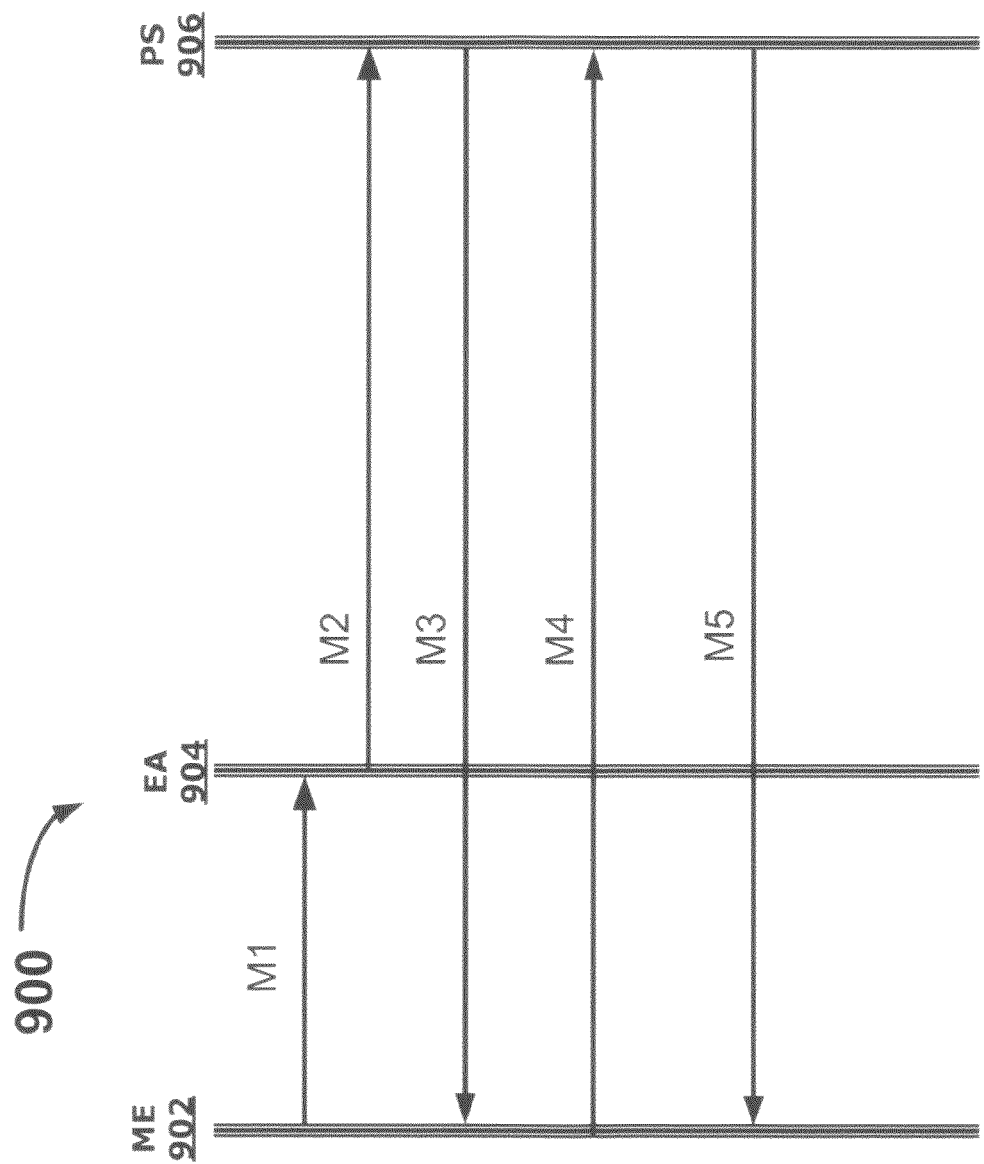
FIG. 9 illustrates a flow according to some embodiments of the inventions.

FIG. 9 illustrates a flow protocol 900 according to some embodiments. The flow 900 of FIG. 9 includes an ME 902, an EA 904, and a PS 906. In flow 900 the ME 902 creates M1 to include an RSA encrypt (for example, RPSK-pub, current time, a SafeID sign indicating "I am an ME", a current time, etc). The EA then constructs an authentication message and sends it as M2 to the PS 906. The PS 906 verifies the SafeID signature and checks a time value to be within a particular time tolerance limit (for example, within 48 hours). The PS 906 creates M3, which includes RAND1 and RAND2, and sends them to the ME 902 (for example, via the EA 904). The ME 902 creates a response M4 to include SafeID sign, RAND2 and RAND3, and sends it to the PS 906 (for example, via the EA 904 and/or an ES). The PS 906 then verifies the SafeID signature to definitively prove that the other side is an ME 902 and not an imposter. The PS sends a message M5 to the ME 902, and the ME 902 then validates M5 before it installs the permit, replaces a manufacturing test permit or trial permit, and/or activates the next feature in the next system reboot.

In some embodiments, upgrading and/or reconfiguring of hardware (SKU) is allowed via a remote protocol mechanism. In some embodiments implementation is performed in an ICH (I/O controller hub), an MCH (memory controller hub), a GMCH (graphics and memory controller hub), a PCH (platforms controller hub), and/or another chipset or hardware device. In some embodiments, hardware may be upgraded remotely and securely, while maintaining and assuring user privacy.

In some embodiments, an integrated controller is combined with a network protocol and embedded cryptographic functions to allow for the development of a robust protocol to communicate out of band of the client OS to provide a secure, private, and reliable way of exchanging information. In some embodiments, information is exchanged outside of the scope of system OS and malware attacks. In some embodiments, a CLS (Capability Licensing Service) provides information on how to allow hardware to change a configuration state.

In some embodiments, the hardware configuration of a computer may be changed. In some embodiments, the hardware configuration of a computer may be changed using an override control mechanism at boot/initialization time. In some embodiments, a software based upgrade mechanism is used to upgrade the hardware itself, without any need to open the computer or replace hardware. In some embodiments, this is implemented using an embedded microcontroller, firmware, and hardware to allow software based hardware upgrade.

Figure 10:
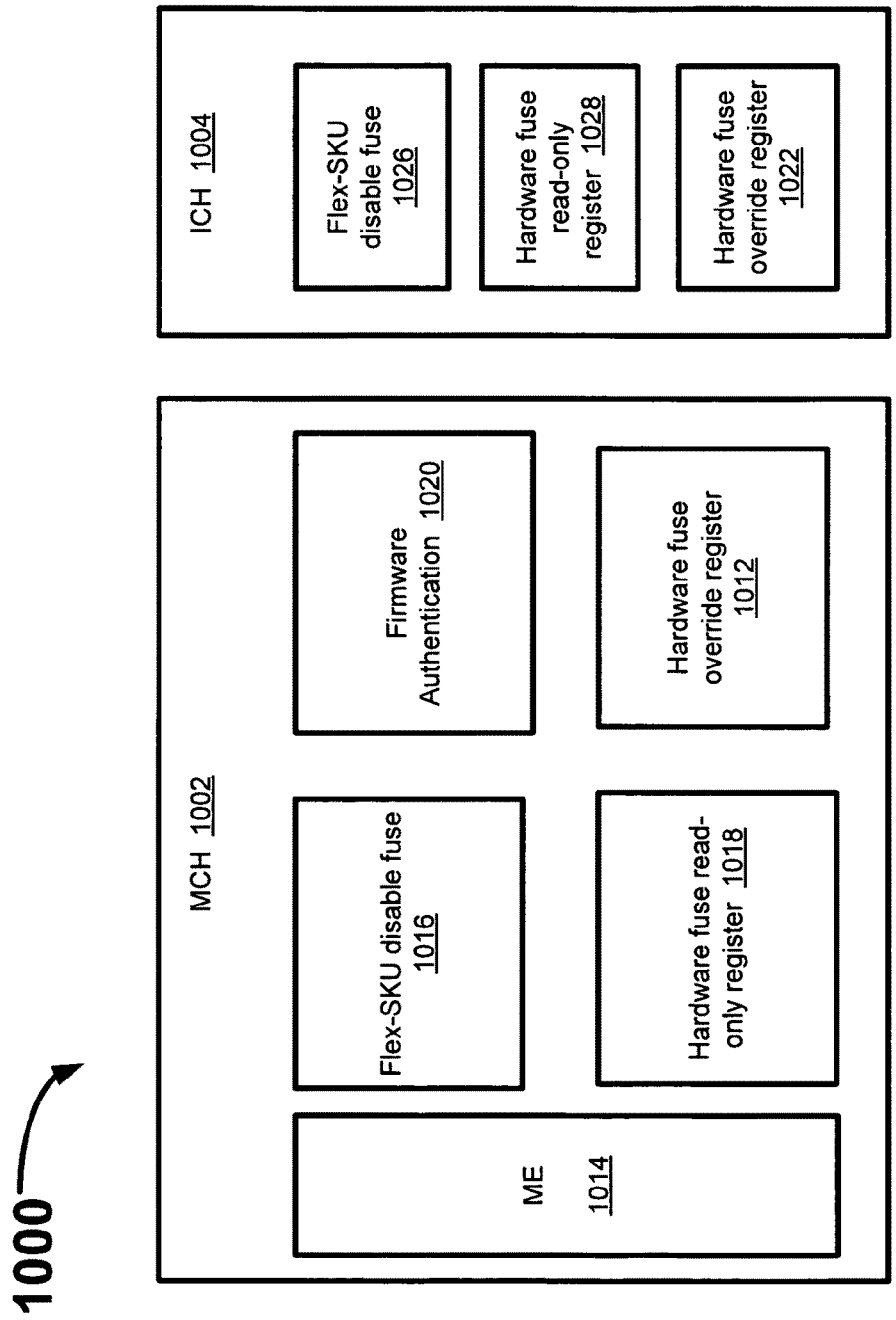
FIG. 10 illustrates a system according to some embodiments of the inventions.

FIG. 10 illustrates a system 1000 according to some embodiments. In some embodiments, system 1000 includes a memory controller hub (MCH) 1002 and an Input/Output (I/O) Controller Hub (ICH) 1004. In some embodiments MCH 1002 includes one or more hardware fuse override registers 1012, a Management Engine (and/or Manageability Engine and/or ME) 1014, one or more flexible SKU (Flex-SKU) disable fuse 1016, one or more hardware fuse read-only registers 1018, and/or firmware authentication module 1020. In some embodiments, ICH 1004 includes one or more hardware fuse registers 1022, one or more flexible SKU (Flex-SKU) disable fuse 1026, one or more hardware fuse read-only registers 1028.

In some embodiments, hardware fuse override registers 1012 and/or 1022 enable the ME firmware to override the setting of the hardware feature fuses of each component participating in the Flexible SKU solution (for example, the MCH 1002 and/or the ICH 1004). These registers are not writeable by the host. This ensures that host software cannot program them once they are configured by the ME firmware, and/or that other firmware runtime bugs do not result in the registers being reprogrammed. The ME firmware programs and locks these registers very early in the boot/initialization cycle of the platform.

In some embodiments, the ME 1014 is a hardware processing engine that executes the programming of the fuse override configuration illustrated in FIG. 10. The ME 1014 runs signed/authenticated and verified firmware code. This ME firmware interacts with user code executing in the operating system (OS). The user code can interact with the ME firmware code to program the hardware fuse override registers 1012 and/or 1022. The ME firmware ensures that all conditions are met before it changes the values in the hardware fuse override registers. In this manner, only the firmware running on the ME 1014 is able to program the hardware fuse override registers 1012 and 1022.

The Flex-SKU disable fuse 1016 and/or Flex-SKU disable fuse 1026 are hardware fuses that are used to disable the hardware fuse override configuration of system 1000 of FIG. 10. The fuses 1016 and 1026 are readable by firmware, and the flexible SKU firmware will only operate when fuses 1016 and/or 1026 are set to an enabled state (that is, set to enable Flexible SKU, for example). Fuses 1016 and/or 1026 are very important for the initial override mechanism so that the override feature can be disabled in the event of a serious flaw. This hardware disable may also be used in some embodiments to define SKUs of the chipset with the override mechanism or those that ship without the mechanism.

In some embodiments, hardware fuse read-only registers 1018 and/or 1028 allow the hardware to support firmware read access to the hardware feature fuses of each component participating in the override solution.

In some embodiments, the firmware authentication 1020 provides a way to authenticate that the ME firmware module that can modify hardware override registers must only be firmware that is authored by a particular company (for example, the company that manufactured the hardware). This ensures that an attacker cannot write their own firmware and use it to enable features on the hardware.

In some embodiments the MCH 1002 illustrated in FIG. 10 includes additional features that are not illustrated in FIG. 10. For example, in some embodiments, MCH 1002 includes a chipset identifier (chipset ID), an ME debug disable mechanism, a chipset fuse key, a random number generator (RNG), a monotonic counter, and/or additional features.

In some embodiments, a chipset ID is included in MCH 1002 to provide a mechanism to allow firmware to identify that it is running on a given family of hardware. In some embodiments, MCH 1002 includes an ME debug disable mechanism that is supported to prevent system debug capabilities in production hardware from being used as a method of attacking a CLS system. In some embodiments, MCH 1002 includes a chipset fuse key that provides firmware read access of a set of fuses that uniquely identify CLS hardware. The chipset fuse key is used by firmware to generate a signal used to match platform hardware to permits. In some embodiments, MCH 1002 includes a random number generator (RNG) (for example, a true RNG) to provide a secure CLS and Flexible SKU system. In some embodiments where hardware RNG is not possible a firmware implementation of a pseudo random number generator is used to meet security and privacy concerns. In some embodiments MCH 1002 includes a monotonic counter to support permit revocation and upgrade flows.

According to some embodiments, a flow of control to program hardware override registers during a system initialization/boot time proceeds in the following manner. First the user starts the system and the ME 1014 then initializes. Then the ME 1014 reads the hardware fuse matrix and writes it into the hardware fuse read only register 1018 and/or 1028. The ME 1014 sets a bit in an internal register to let the override mechanism know that it can execute. Then the override firmware checks to determine whether the mechanism is turned on or off by reading the Flex-SKU disable fuse 1016 and/or 1026. If not enabled, the override firmware allows the platform boot process to continue without executing any further firmware override steps. If it is enabled, then the override firmware in the ME continues, in which case it reads the new override fuse map from a secure/trusted location. The ME override firmware then writes the new override fuse map to the hardware fuse override registers 1012 and/or 1022.

According to some embodiments, a hardware upgrade service is implemented in which end users are able to change hardware configurations (for example, of their chipsets) to enable new features in return for a monetary payment. A secure transaction is performed between the end user and a company such as the company that manufactured the hardware. After receiving payment, the company issues a secure and signed permit to the user's computer (for example, to the chipset of the user's computer). The user's computer (and/or chipset) verifies the permit and uses the information in the permit to program the fuse override register at boot time to enable the new configuration.

According to some embodiments, hardware configurations are changed using software programming without any physical alterations of the hardware.

FIG. 11 illustrates a protocol flow 1100 according to some embodiments. In some embodiments FIG. 11 includes an ME 1102 (for example, in some embodiments ME 1102 is similar to or the same as all or some of the MEs described herein such as ME 112, ME 212, ME 300, ME 402, etc) and a permit server (PS) 1104 (for example, in some embodiments, PS 1104 is similar to or the same as all or some of the other permit servers described herein such as PS 404, 504, etc).

In some embodiments, a permit signing key pair is an asymmetric (RSA) key pair used for permit signing and verification. The private key of the pair is located at a permit server such as PS 1104, for example, residing in a secure data center facility (for example, with HSM). The public portion of this key pair is located in a chipset ROM and/or a signed ME firmware image, for example, and cannot be changed by anyone. Permits are signed by the private portion of this key pair, and the public portion is used by an ME (for example, ME 1102) to verify the signature.

In some embodiments, a chipset fuse key is located in chipset fuses. In some embodiments, the chipset fuse key is unique for every chipset part. The chipset fuse key is uniquely programmed into every chipset during a manufacturing process by randomly flowing fuses in a program and forget manner. No one (including the manufacturer) has knowledge of this key, and the ME (for example, ME 1102) never lets this key be accessed externally.

In some embodiments as illustrated in FIG. 11, the chipset of a computer generates a unique identifier such as a Permit Authentication Identifier (or PAID) in such a way that the identifier is bound to a particular chipset or chipset part. According to some embodiments, this is done in a way such that it is not possible to link the PAID back to the particular chipset instance. By looking at the identifier the chipset can determine whether or not the identifier is bound to that particular chipset instance. However, it is not possible by looking at the identifier to link it back to the particular chipset instance to which the identifier is bound. Such a Permit Authentication Identifier (PAID) is illustrated in FIG. 11 as PAID 1112.

In some embodiments, ME 1102 generates a new PAID 1112 which is bound to the particular chipset, chipset instance, and/or computer in which ME 1102 resides. Permit server (PS) 1104 received PAID 1112 from ME 1102, and then generates a permit 1122 and embeds the PAID 1112 inside the permit 112 as PAID 1124. Permit 1122 includes PAID 1124 and other permit data 1126. Permit 1122 also includes and/or is attached to a signature 1128.

ME 1102 receives the signature 1128 and verifies it using a permit signing public key (that is, a public portion of a permit signing key pair, for example). Then the ME 1102 verifies the PAID 1124. If the PAID verification is successful, the ME 1102 determines that the permit 1122 is in response to the PAID 1112 that was sent only by the ME 1102 (and/or the computer in which the ME 1102 resides) and was not sent from any other ME (and/or computer).

In some embodiments, PS 1104 is a trusted provisioning server that creates authenticated permits to be used by the ME 1102. PS 1104 has secure access (for example, via HSM) to a cryptographic RSA key, whose public component is embedded in the signed ME firmware. Therefore, PS 1104 is able to create permits such as permit 1122 that an ME such as ME 1102 can authenticate as having originated from a trusted entity. In some embodiments, the permit server 1104 embeds hardware fuse override information in the signed permit which the ME 1102 then uses (for example, for soft SKU and/or upgrading hardware within the computer in which ME 1102 resides). In some embodiments PS 1104 comprises one or more servers that perform these operations (for example, depending upon infrastructure implementation, transfer capacity requirements, etc).

In some embodiments, permit 1122 is a signed data structure that is the same as and/or similar to other permits described herein (such as, for example, in some embodiments, permit 412, permit 602, etc). Permit 1122 is a signed data structure containing the hardware fuse override information (for example, in a 'Feature ID' field). No one other than a particular company can create a permit 1122 in a way that can be successfully validated by the ME 1102. In some embodiments, that company is, for example, the owner of the permit server 1104 and/or the manufacturer of the ME 1102, of the chipset including the ME 1102, etc). In some embodiments, permit 1122 further includes a class and subclass identifier indicating an interpretation of the rest of the data structure. In some embodiments, permit 1122 contains a time stamp indicating when it was creating (for example, in a 'Timestamp' field). Permit 1122 also includes in some embodiments attributes (for example, in a 'Flags' field) that indicate some permit characteristics such as whether or not the system will reboot immediately after permit installation.

In some embodiments, ME 1102 is a hardware processing engine that executes programming of the fuse override mechanism. ME 1102 runs signed/authenticated and verified firmware code. This ME firmware can interact with user code executing in the operating system (OS). The user code can interact with the ME firmware code to program the hardware override registers. The ME firmware ensures that all conditions are met (including permit validation) before it changes the values in the hardware fuse override registers. The ME 1102 also executes its end of the permit installation protocol.

In some embodiments (for example in some embodiments of FIG. 11) PAID regeneration is performed according to the following steps:

Generate a random value 'R'

Store R in a secure flash

Generate PAID=H(X|Y|Z) where X, Y and Z are defined below, and H is a secure hash function as described below.

X=Permit Authorization Key=H (R, CFK)

Y=Permit Authorization Message=a well known string—"Permit Authorization Message"

Z=Feature ID requested by the customer to which the upgrade is required

In some embodiments, the secure flash is a component on the computer's motherboard that can persistently store data in a non-volatile flash media. In some embodiments, the data stored on this flash media is confidentially protected, integrity protected, and/or anti-replay protected.

In some embodiments, the secure hash function (H) is a cryptographically secured one way hash function. For example, in some embodiments, hash function (H) is one or more of SHA1, SHA-256, MD5, etc.

In some embodiments, a PAID value is used in a CLS permit installation protocol to bind the permit request and the permit to a specific computing machine, hardware device, hardware part, chipset, chipset part, etc. The PAID is included in the initial message that is sent to the PS (for example, PS 1104) from the ME (for example, ME 1102). The PS embeds the PAID value in the signed permit which is returned to the ME from the PS in the response message. The ME first verifies the signature on the permit. If successful, the ME then verifies the PAID value inside the permit. To verify the PAID, the ME recreates the PAID (for example, using the steps described above) and compares it with the PAID in the permit (for example, PAID 1124 in permit 1122). If the verification is successful, then the ME is assured that this permit is sent by the PS in response to the request sent only by this ME and by no other entity. The ME then accepts the permit.

In some embodiments, the ME (for example, ME 1102) generates a new PAID every time it needs to create a permit request to send to the PS. Since one of the ingredients of the PAID is a random number (for example, 'R'), no two PAIDs will look alike as long as the random number is different. This ensures that any two PAID values generated by the same ME look completely different from each other. No one is able to differentiate between two PAID values coming from the same ME or from separate MEs. This ensures user privacy when purchasing and/or obtaining permits from the PS. The PS cannot correlate two PAID values on its end and use them to link the two PAID values to the same user.

In some embodiments, purchases under network traffic protect privacy at the ends of the transaction. According to some embodiments, the transaction is anonymous to the seller of the services. In some embodiments, a transaction (for example, for an internet purchase) is secured without the need for unique identifiers. The unique ID is removed as a required for a network purchase transaction.

In some embodiments, a hardware upgrade service is implemented in which the transaction is anonymous to the seller. End users can change a hardware configuration (for example, of a chipset) to enable new features in return for a payment. A secure transaction is enabled between the end user and the provider of the hardware upgrade where, after receiving payment, the provider of the hardware upgrade issues a secure and signed permit to the user's computer (for example, to the chipset). The user's computer (and/or chipset of that computer) is able to ensure that PAIDs embedded in different permits for the same computer do not look alike. This protects the privacy of the end user because no entity (including the PS) can link the permit (or the PAID) to the same hardware instance (for example, chipset instance) that created the PAID.

Although some embodiments have been described herein as being implemented in a chipset, an MCH, a GMCH, an ICH, a PCH, etc., according to some embodiments these particular implementations may not be required. For example, in some embodiments, implementations can occur in other devices (for example, some embodiments described herein as happening in the MCH or GMCH can also occur in the PCH according to some embodiments, or in some other device not described herein in some embodiments).

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
creating, by a management engine in a system a secure permit request for a permit to change a hardware configuration of a hardware component of the system having a processor, wherein the hardware configuration is a hardware configuration of a chipset or a chipset part, wherein the secure permit request includes permit authentication information to bind the permit to the system, wherein a unique key has been permanently programmed into the hardware component by randomly blowing fuses in the hardware component during manufacturing, and wherein the management engine is capable of running services separate from a controller in the system;
sending the secure permit request to a remote location, wherein the unique key is used to ensure secure communication and permit authentication with the remote location;
receiving, by the management engine, a permit message sent from the remote location in response to the secure permit request, wherein the permit message includes the permit authentication information; and
changing, by the management engine, the hardware configuration of the hardware component by updating registers in the hardware configuration in response to validating the permit authentication information in the received permit message.

2. The method of claim 1, wherein the secure permit request and the permit protect privacy of a user of the hardware component.

3. The method of claim 1, wherein the secure permit request and the permit protect privacy of the hardware component.

4. The method of claim 1, wherein one or more cryptographic keys are used to ensure secure communication with the remote location.

5. The method of claim 1, wherein the unique key is not accessible by software running outside of the hardware component.

6. The method of claim 1, wherein the permit includes a unique signature from the remote location.

7. The method of claim 1, further comprising validating the received permit using a public key which corresponds to a private signing key located at the remote location.

8. The method of claim 1, wherein the remote location is a secure and trusted location.

9. The method of claim 1, wherein the changing of the hardware configuration is performed without any physical change to the hardware component.

10. The method of claim 1, wherein the permit is a secure permit and/or a signed permit.

11. The method of claim 1, wherein transaction information is bound inside the permit such that future returns or exchanges can be enabled.

12. The method of claim 1, wherein once a permit is signed for a particular hardware part it cannot be used on another hardware part.

13. The method of claim 1, wherein software running outside of the hardware component cannot emulate the functionality of software running inside the hardware component.

14. The method of claim 1, further comprising performing an override during a boot and/or initialization process, and changing the hardware configuration in response to the override.

15. The method of claim 1, wherein the secure permit request is not uniquely identifiable.

16. The method of claim 1, wherein the identity of the hardware component and/or the user of the hardware component is not determinable from the secure permit request.

17. The method of claim 1, further comprising generating a random value and generating the secure permit request in response to the random value.

18. The method of claim 1, wherein the management engine comprises a hardware processing engine separate from the processor in the system.

19. The method of claim 1, wherein the management engine has access to computational resources not accessible to an operating system executed by the processor in the system.

20. The method of claim 1, wherein the management engine configures the hardware component by changing values in hardware fuse override registers in the hardware component.

21. A method comprising:
receiving, at a permit server, from a system at a remote location a secure permit request for a permit to change a hardware configuration of a hardware component of the system at the remote location, wherein the hardware configuration is a hardware configuration of a chipset or a chipset part, wherein a unique key has been permanently programmed into the hardware component by randomly blowing fuses in the hardware component during manufacturing, wherein the unique key is used to ensure secure communication and permit authentication between the permit server and the system at the remote location, and wherein the secure permit request includes permit authentication information to bind the permit to the system; and
sending, by the permit server, a permit message to the system remote location in response to the secure permit request, wherein the permit message includes the permit authentication information, and wherein the permit message is to allow the remote location to change the hardware configuration of the hardware component by updating registers in the hardware configuration in response to validating the permit authentication information in the permit message at the remote location.

22. The method of claim 21, wherein the secure permit request and the permit protect privacy of a user of the hardware component.

23. The method of claim 21, wherein one or more cryptographic keys are used to ensure secure communication and permit authentication with the remote location.

24. The method of claim 21, wherein the permit includes a unique signature.

25. The method of claim 21, wherein the permit is to allow the remote location to change the hardware configuration without any physical change to the hardware component.

26. The method of claim 21, wherein the permit is a secure permit and/or a signed permit.

27. The method of claim 21, wherein the permit is to allow the remote location to change the hardware configuration in response to an override operation performed during a boot and/or initialization process.

28. The method of claim 21, wherein the secure permit request is not uniquely identifiable.

29. The method of claim 21, wherein the identity of the hardware component and/or the user of the hardware component is not determinable from the secure permit request.

30. The method of claim 21, wherein the secure permit request has been created at the remote location in response to a random value.

31. The method of claim 21, further comprising using a private signing key that corresponds to a public key located at the remote location to help in validation of the permit at the remote location.

32. The method of claim 21, wherein transaction information is bound inside the permit such that future returns or exchanges can be enabled.

33. The method of claim 21, wherein once a permit is signed for a particular hardware part it cannot be used on another hardware part.

34. The method of claim 21, wherein software running outside of the hardware cannot emulate the functionality of software running inside the hardware.

35. An apparatus comprising:
a hardware device having a hardware configuration that may be remotely configured, the hardware device including a controller:
to create a secure permit request for a permit to change the hardware configuration of a hardware component, wherein the hardware configuration is a hardware configuration of a chipset or a chipset part, wherein the secure permit request includes permit authentication information to bind the permit to the hardware device, wherein a unique key has been permanently programmed into the hardware component by randomly blowing fuses in the hardware component during manufacturing;
to send the secure permit request to a remote location, wherein the unique key is used to ensure secure communication and permit authentication with the remote location;
to receive a permit message sent including the permit authentication information from the remote location in response to the secure permit request; and
to change the hardware configuration of the hardware component by updating registers in the hardware configuration in response to validating the permit authentication information in the received permit message.

36. The apparatus of claim 35, further comprising one or more cryptographic keys to ensure secure communication and permit authentication with the remote location.

37. The apparatus of claim 35, wherein the unique key is not accessible by software running outside of the hardware device.

38. The apparatus of claim 35, wherein the permit includes a unique signature from the remote location.

39. The apparatus of claim 35, the controller further to validate the received permit using a public key which corresponds to a private signing key located at the remote location.

40. The apparatus of claim 35, wherein the remote location is a secure and trusted location.

41. The apparatus of claim 35, further comprising the controller to change the hardware configuration without any physical change to the hardware component.

42. The apparatus of claim 35, wherein the permit is a secure permit and/or a signed permit.

43. The apparatus of claim 35, wherein transaction information is bound inside the permit such that future returns or exchanges can be enabled.

44. The apparatus of claim 35, wherein once a permit is signed for a particular hardware device it cannot be used on another hardware device.

45. The apparatus of claim 35, wherein software running outside of the hardware device cannot emulate the functionality of software running inside the hardware device.

46. The apparatus of claim 35, further comprising the controller to perform an override during a boot and/or initialization process, and to change the hardware configuration in response to the override.

47. The apparatus of claim 35, wherein the secure permit request is not uniquely identifiable.

48. The apparatus of claim 35, wherein the identity of the hardware component and/or the user of the hardware component is not determinable from the secure permit request.

49. The apparatus of claim 35, wherein the apparatus includes a processor executing code, and wherein the controller comprises a hardware processing engine separate from the processor.

50. The apparatus of claim 49, wherein the controller has access to computational resources not accessible to an operating system executed by the processor in the system.

51. The apparatus of claim 35, wherein the controller configures the hardware configuration by changing values in hardware fuse override registers in the hardware configuration.

52. An apparatus comprising:
a server including hardware:
to receive from a remote location a secure permit request for a permit to change a hardware configuration of a hardware component of a system at the remote location, wherein the hardware configuration is a hardware configuration of a chipset or a chipset part, wherein a unique key has been permanently programmed into the hardware component by randomly blowing fuses in the hardware component during manufacturing, wherein the unique key is used to ensure secure communication and permit authentication between the permit server and the system at the remote location, and wherein the secure permit request includes permit authentication information to bind the permit to the system; and
to send a permit message to the remote location in response to the secure permit request, wherein the permit message includes the permit authentication information, and wherein the permit is to allow the remote location to change the hardware configuration of the hardware component by updating registers in the hardware configuration in response to the remote location validating the permit authentication information in the permit message.

53. The apparatus of claim 52, wherein one or more cryptographic keys are used to ensure secure communication and permit authentication with the remote location.

54. The apparatus of claim 52, wherein the permit includes a unique signature.

55. The apparatus of claim 52, wherein the permit is to allow the remote location to change the hardware configuration without any physical change to the hardware component.

56. The apparatus of claim 52, wherein the permit is a secure permit and/or a signed permit.

57. The apparatus of claim 52, wherein the permit is to allow the remote location to change the hardware configuration in response to an override operation performed during a boot and/or initialization process.

58. The apparatus of claim 52, wherein the secure permit request is not uniquely identifiable.

59. The apparatus of claim 52, wherein the identity of the hardware component and/or the user of the hardware component is not determinable from the secure permit request.

60. The apparatus of claim 52, wherein the secure permit request has been created at the remote location in response to a random value.

61. The apparatus of claim 52, further comprising the server to use a private signing key that corresponds to a public key located at the remote location to help in validation of the permit at the remote location.

62. The apparatus of claim 52, wherein transaction information is bound inside the permit such that future returns or exchanges can be enabled.

63. The apparatus of claim 52, wherein once a permit is signed for a particular hardware part it cannot be used on another hardware part.

64. The method of claim 52, wherein software running outside of the hardware component cannot emulate the functionality of software running inside the hardware component.

* * * * *